United States Patent
Huang et al.

(10) Patent No.: US 10,735,960 B2
(45) Date of Patent: Aug. 4, 2020

(54) WAKE UP RECEIVER FRAME AUTHENTICATION

(71) Applicant: Intel Corporation and Intel IP Corporation, Santa Clara, CA (US)

(72) Inventors: Po-Kai Huang, San Jose, CA (US); Shahrnaz Azizi, Cupertino, CA (US); Daniel F. Bravo, Hillsboro, OR (US); Ido Ouzieli, Tel Aviv (IL); Emily H. Qi, Gig Harbor, WA (US); Noam Ginsburg, Portland, OR (US); Robert J. Stacey, Portland, OR (US)

(73) Assignee: Intel Corporation and Intel IP Corporation, Santa Clara, CA (US)

( * ) Notice: Subject to any disclaimer, the term of this patent is extended or adjusted under 35 U.S.C. 154(b) by 31 days.

(21) Appl. No.: 16/176,541

(22) Filed: Oct. 31, 2018

(65) Prior Publication Data

US 2019/0069176 A1 Feb. 28, 2019

Related U.S. Application Data

(60) Provisional application No. 62/579,501, filed on Oct. 31, 2017, provisional application No. 62/684,883, filed on Jun. 14, 2018.

(51) Int. Cl.
| | |
|---|---|
| *H04W 12/06* | (2009.01) |
| *H04W 12/04* | (2009.01) |
| *H04W 52/02* | (2009.01) |
| *H04L 9/08* | (2006.01) |
| *H04L 9/32* | (2006.01) |
| *H04L 9/12* | (2006.01) |

(52) U.S. Cl.
CPC ........... *H04W 12/06* (2013.01); *H04L 9/0833* (2013.01); *H04L 9/0891* (2013.01); *H04L 9/12* (2013.01); *H04L 9/3228* (2013.01); *H04W 12/04* (2013.01); *H04W 52/028* (2013.01); *H04W 52/0216* (2013.01); *H04W 52/0229* (2013.01); *H04W 52/0235* (2013.01); *H04L 2209/80* (2013.01)

(58) Field of Classification Search
CPC ..................................................... H04W 12/06
See application file for complete search history.

(56) References Cited

U.S. PATENT DOCUMENTS

| | | | | |
|---|---|---|---|---|
| 2012/0110331 | A1* | 5/2012 | Falk ................. | H04W 52/0229 713/168 |
| 2012/0289192 | A1* | 11/2012 | Abraham ............. | H04L 1/0061 455/410 |
| 2016/0381718 | A1* | 12/2016 | Ahuja .................. | H04W 76/10 370/338 |
| 2017/0134943 | A1* | 5/2017 | Min ..................... | H04W 12/06 |
| 2018/0018185 | A1* | 1/2018 | Sun ......................... | G06F 21/44 |

(Continued)

*Primary Examiner* — Jason E Mattis
(74) *Attorney, Agent, or Firm* — Schwegman Lundberg & Woessner, P.A.

(57) ABSTRACT

Methods and systems for authenticated wake-up radio frames are disclosed. In one aspect, a method includes generating a wake-up radio (WUR) integrity group key (IGTK) for authentication of WUR frames when received by a wake-up radio (WURx). The WUR IGTK may be identified via a key identifier in the WUR frame. The key identifier may be updated when the WUR IGTK is updated, facilitating WUR IGTK key updating across multiple associated stations.

22 Claims, 28 Drawing Sheets

(56) References Cited

U.S. PATENT DOCUMENTS

2018/0063788 A1* 3/2018 Yang ............... H04W 12/00502
2018/0206193 A1* 7/2018 Adachi ............. H04W 72/0406
2019/0268847 A1* 8/2019 Asterjadhi .......... H04L 61/1541

* cited by examiner

BSS

| Type | Description |
|---|---|
| 1 | WUR Beacon |
| 2 | WUR Wake-Up |
| 3 | WUR Vendor Specific |
| 4-7 | Reserved |

FIG. 11

| OUI | Data Type | Meaning |
|---|---|---|
| 00-0F-AC | 0 | Reserved |
| 00-0F-AC | 1 | GTK KDE |
| 00-0F-AC | 2 | Reserved |
| 00-0F-AC | 3 | MAC address KDE |
| 00-0F-AC | 4 | PMKID KDE |
| 00-0F-AC | 5 | SMK KDE |
| 00-0F-AC | 6 | Nonce KDE |
| 00-0F-AC | 7 | Lifetime KDE |
| 00-0F-AC | 8 | Error KDE |
| 00-0F-AC | 9 | IGTK KDE |
| 00-0F-AC | 10 | Key ID KDE |
| 00-0F-AC | 11 | Multi-band GTK KDE |
| 00-0F-AC | 12 | Multi-band KEY ID KDE |
| 00-0F-AC | 13-255 | Reserved |
| Other OUI or CID | Any | Vendor Specific |

FIG. 16

WAKE UP RECEIVER FRAME AUTHENTICATION

CROSS REFERENCE TO RELATED APPLICATIONS

This application claims priority to U.S. Provisional Application No. 62/684,883, filed Jun. 14, 2018, and entitled "Wave Up Receiver Frame Authentication," and to U.S. Provisional Application No. 62/579,501, filed Oct. 31, 2017 and entitled "Wake-Up Radio Frame Authentication with Time Synchronization Function." The contents of these prior applications are considered part of this application, and are hereby incorporated by reference in their entirety.

TECHNICAL FIELD

This disclosure generally relates to systems and methods for wireless communications and, more particularly, to wake-up receiver (WUR) frame authentication.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

BRIEF DESCRIPTION OF THE DRAWINGS

The present disclosure is illustrated by way of example and not limitation in the figures of the accompanying drawings, in which like references indicate similar elements and in which:

FIG. 11 shows one embodiment of defined values for the type field

FIG. 16 shows assignments of data type field values.

DETAILED DESCRIPTION

Figure 1:
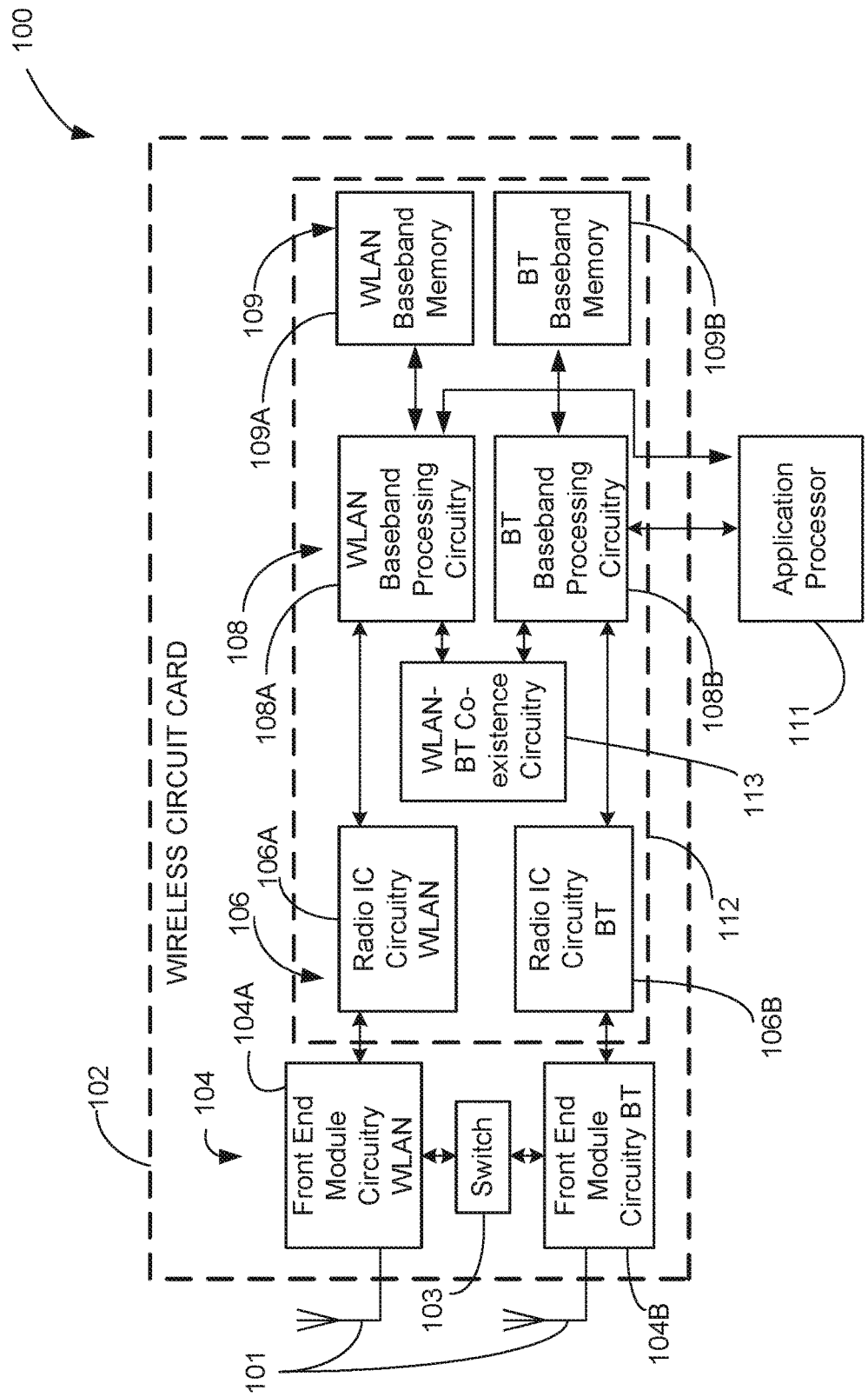
FIG. 1 is a block diagram of a radio architecture, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A low power wake-up radio (LP-WUR) architecture provides ultra-low power operation for a Wi-Fi device. Generally, a device implementing a low power WUR architecture will operate in at least two modes. In a first mode, the device is fully operable or awake, in that it is able to transmit and receive data on a wireless network in compliance with whatever wireless specification the device is designed to comply with. In a second mode, the device may consume less power and may be at least partially inoperable. For example, the device may be unable to transmit data on the network. Furthermore, the device may be unable to receive at least some information it could otherwise receive if in the fully operable or awake mode. Because the device is able to depower its traditional Wi-Fi receiver and transmit capabilities, the device is able to save a relatively substantial amount of power while operating in this mode (compared to the fully operable or awake mode).

In some aspects, the device implementing the low power wake-up radio technique may include two physically separate receivers: a first, fully functional transceiver; and a second, low power receiver optimized to receive the wake-up signal and generate a signal, either to the fully functional receiver/transceiver or to a hardware processor indicating the wake-up signal has been received. In some aspects, messages received by the wake-up radio may be encoded differently than messages received by the fully functional receiver/transceiver. For example, the wake-up radio may receive signals encoded using on-off keying (OOK) in some aspects.

Implementations of a Low Power Wake-Up Receiver (LP-WURx) provides for low power operation of a Wi-Fi device. When the device is operating in a minimum radio configuration, it may still receive a wake-up packet from a peer device, such as an access point. However, because a majority of the device's processing circuitry is shut down, it operates at a reduced lower consumption level when compared to a second mode that is fully operational or awake.

In some embodiments, a wake-up radio is configured with both transmitting and receiving components. The receiver side is called a wake-up receiver (WURx).

The broadcast/multicast integrity protocol (BIP) uses an integrity group temporal key (IGTK) for message security. In some implementations, a WUR frame that requires authentication could use the IGTK used for BIP authentication for WUR frame authentication. Such a solution has some disadvantages. For example, if both BIP and WUR use the same IGTK, the key size must be the same. However, wake-up radio frames operate under different size constraints than BIP frames. For example, when an IGTK is designed for BIP-CMAC-256, the key length is larger than a desired length of a key for WUR frames, which is 128. An additional disadvantage of the BIP IGTK is that a key key ID associated with a BIP IGTK is not provided to the LP_WUR STA. As a result, there is an ambiguity during IGTK key update.

To solve these technical problems associated with use of the BIP IGTK, a WUR frame authentication system may indicate a key identifier for a key used in WUR authentication in a WUR frame to prevent ambiguity when WUR keys are updated across multiple STAs. A key identifier included in a WUR frame may identify a recently new IGTK or a previously used IGTK that is in the process of being replaced by the new IGTK.

Some embodiments negotiate separate integrity keys for use in a BIP protocol (i.e. the IGTK) and a key used in WUR authentication. Each of the two keys, e.g., the IGTK and the new integrity key (called a WUR IGTK throughout this disclosure) will be assigned a key identifier. Key identifiers for the BIP key may be assigned from a first defined range, while key identifiers for the WUR IGTK may be assigned from a second non-overlapping defined range. When a key identifier is provided to a STA, the STA can determine which key to use to calculate a MIC for the received message. Thus, during a WUR key update operation, some STAs may have a more recent key than other STAs. In this situation, the AP may utilize the older key when broadcasting a message to multiple associated STAs. Since all associated STAs have the older key, the AP may use this key for broadcast operations until all of the associated STAs have been updated to a more recent key, having a different key identifier than the older key.

An additional advantage of using a different key for WUR authentication v. the BIP protocol, is that the key size may be tailored for the WUR authentication, and WUR authentication is not required to use a sub-optimal key size used for BIP, which is generally too large.

Some of the disclosed embodiments provide for computation of a message integrity code (MIC) for WUR frames. A portion of a transmitting device's time synchronization function (TSF) may be included in the WUR frame and the message integrity code may be determined based on at least the portion. A second portion of the transmitting device's TSF timer may also be included in the MIC calculation, but may not be specifically included in the WUR frame itself.

When the WUR frame is received by a receiving device, the receiving device calculates its own version of a MIC for the frame. Since the second portion of the transmitting device's TSF is not available, as it was not included in the WUR frame, the receiving device uses an equivalent portion of its own TSF timer when calculating a MIC for the WUR frame. If the calculated MIC matches the MIC in the frame, then validation of the frame is successful and the frame is processed accordingly. Otherwise, if the MICs do not match, the frame may be ignored.

In some cases, drift between the transmitting device's TSF and the receiving device's TSF could cause the MIC comparison to fail. To reduce the frequency of this occurrence, a device receiving a frame estimates the transmitting device's TSF timer and then determines a MIC based on the estimate. If the MICs are equal, the receiving device synchronizing its own TSF timer based on the estimated transmitting device's timer.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a block diagram of a radio architecture 100, in accordance with some embodiments. Radio architecture 100 may include radio front-end module (FEM) circuitry 104, radio IC circuitry 106 and baseband processing circuitry 108. Radio architecture 100 as shown includes both WLAN functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106. In some embodiments, such as the embodiment shown in FIG. 1, the wireless radio card 102 may include separate baseband circuitry 109 for one or more of the WLAN baseband processing circuitry 108A and Bluetooth baseband processing circuity 108B, shown as baseband memories 109A and 109B respectively.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.1 lac, and/or IEEE 802.1 lax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.1 lax standard. In some embodiments the radio architecture 100 may be configured to perform communications in accordance with the IEEE 802.1 lba standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
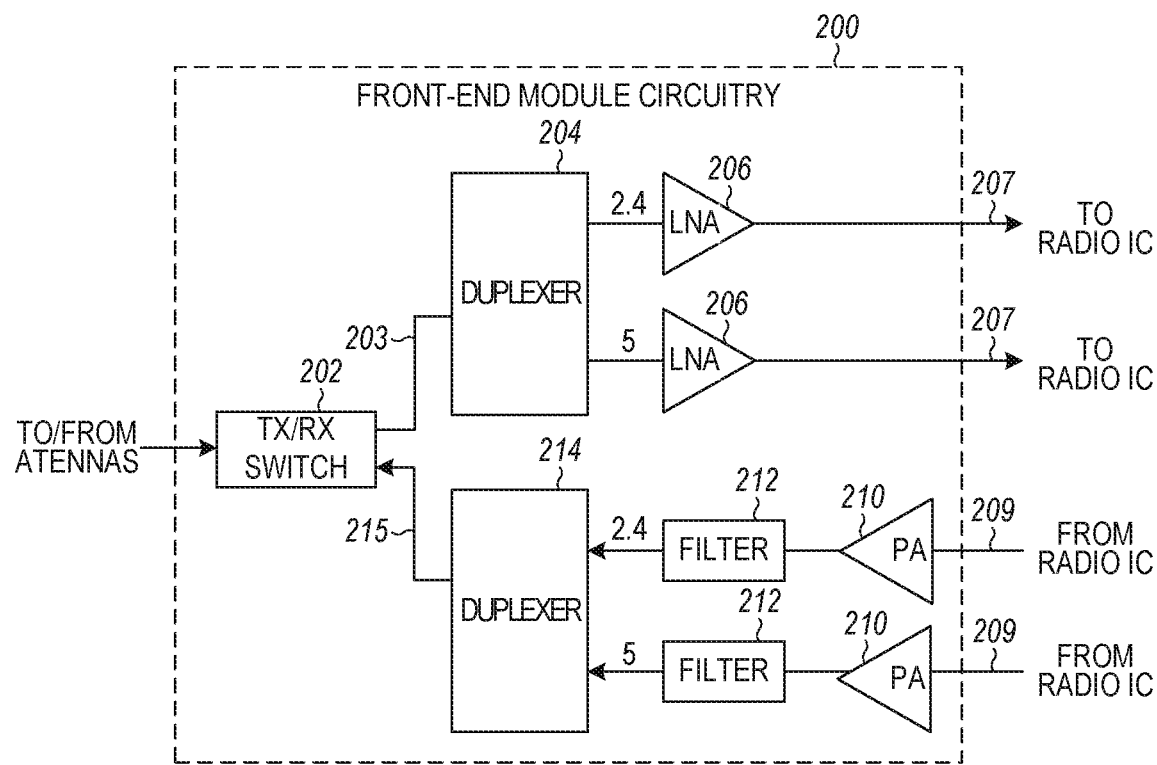
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
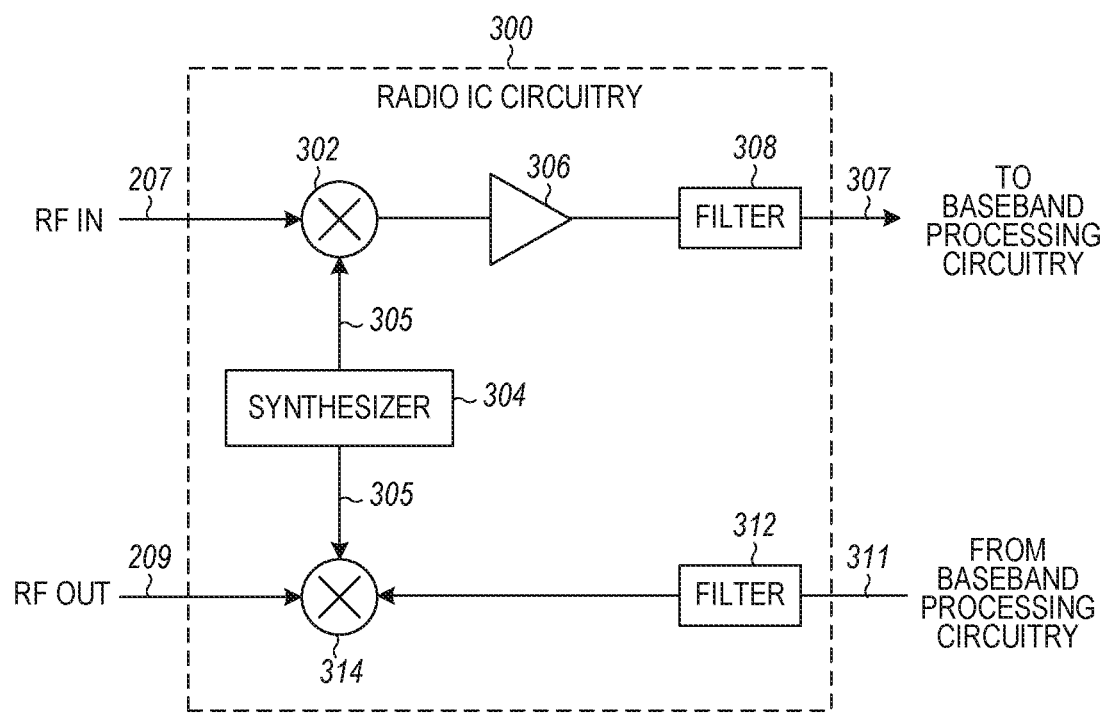
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
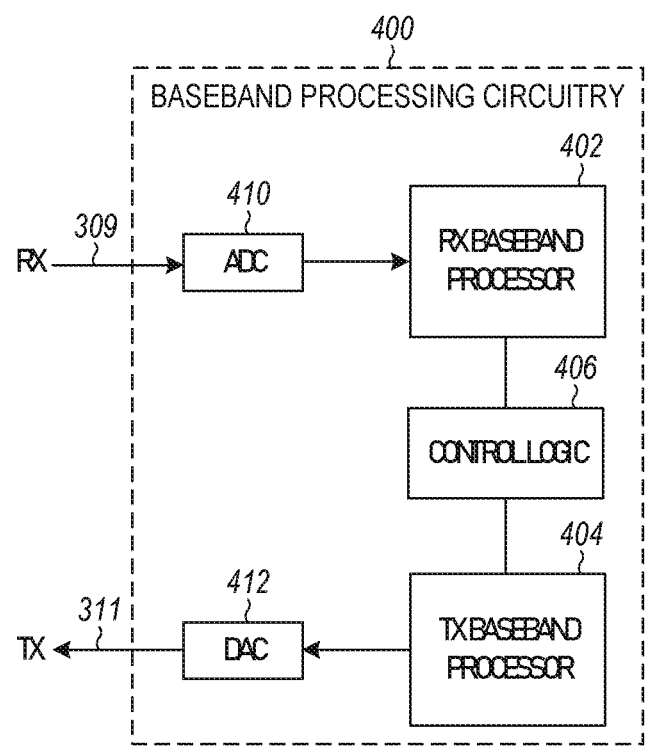
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
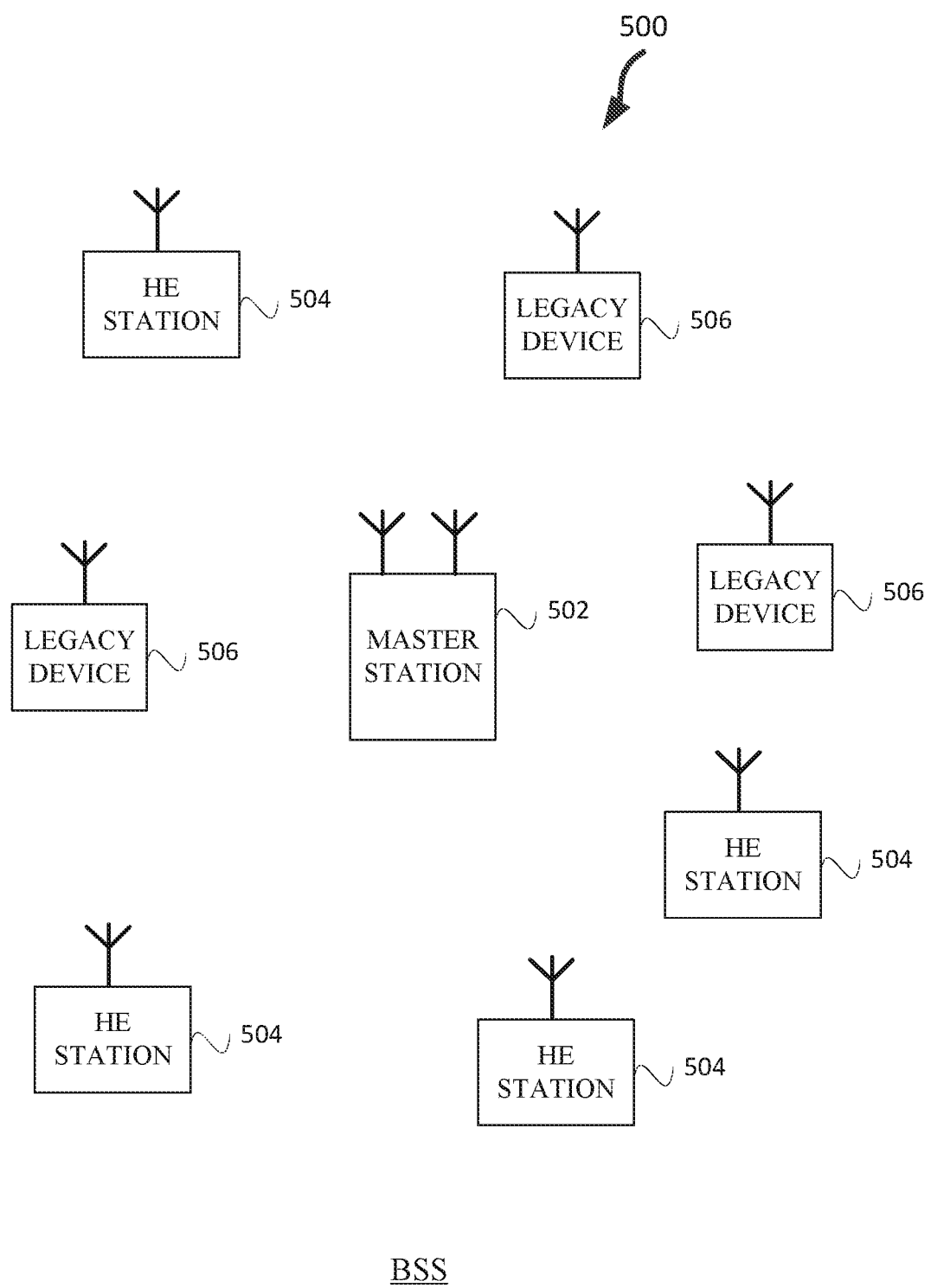
FIG. 5 illustrates a wireless network, in accordance with some embodiments.

FIG. 5 illustrates a WLAN 100 in accordance with some embodiments. The WLAN may comprise a basis service set (BSS) 100 that may include one or more HE AP 502, which may be APs, one or more high efficiency (HE) wireless stations (HE stations) (e.g., IEEE 802.1 lax) HE stations 104, a plurality of legacy (e.g., IEEE 802.11 n/ac) devices 506, a plurality of IoT devices 508 (e.g., IEEE 802.1 lax), and one or more sensor hubs 510.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The HE AP 502 may be a virtual HE AP 502 shares hardware resources with another wireless device such as another HE AP 502.

The legacy devices 506 may operate in accordance with one or more of IEEE 802.11 a/b/g/n/ac/ad/af/ah/aj/ab, or another legacy wireless communication standard. The legacy devices 506 may be STAs or IEEE STAs. The HE stations 504 may be wireless transmit and receive devices such as cellular telephone, smart telephone, handheld wireless device, wireless glasses, wireless watch, wireless personal device, tablet, a portable wireless device, or another device that may be transmitting and receiving using the IEEE 802.11 protocol such as IEEE 802.11ax or another wireless protocol. In some embodiments, the HE stations 504 may be termed high efficiency wireless local-area network (HEW) stations.

The HE AP 502 may communicate with legacy devices 506 in accordance with legacy IEEE 802.11 communication techniques. In example embodiments, the HE AP 502 may also be configured to communicate with HE stations 504 in accordance with legacy IEEE 802.11 communication techniques.

The IoT devices 508 may operate in accordance with IEEE 802.11 lax, IEEE 802.11ba, or another standard of 802.11. The IoT devices 508 may be, in some embodiments, narrow band devices that operate on a smaller sub-channel than the HE stations 504. For example, the IoT devices 508 may operate on 2.03 MHz or 4.06 MHz sub-channels. In some embodiments, the IoT devices 508 are not able to transmit on a full 20 MHz sub-channel to the HE AP 502 with sufficient power for the HE AP 502 to receive the transmission. In some embodiments, the IoT devices 508 are not able to receive on a 20 MHz sub-channel and may use a small sub-channel such as 2.03 MHz or 4.06 MHz sub-channel. In some embodiments, the IoT devices 508 may operate on a sub-channel with exactly 26 or 52 data sub-carriers. The IoT devices 508, in some embodiments, may be short-range, low-power devices.

The IoT devices 508 may be battery constrained. The IoT devices 508 may be sensors designed to measure one or more specific parameters of interest such as temperature sensor, pressure sensor, humidity sensor, light sensor, etc. The IoT devices 508 may be location-specific sensors. Some IoT devices 508 may be connected to a sensor hub 510. The IoT devices 508 may upload measured data from sensors to the sensor hub 510. The sensor hubs 510 may upload the data to an access gateway 512 that connects several sensor hubs 510 and can connect to a cloud sever or the Internet (not illustrated). The HE AP 502 may act as the access gateway 512 in accordance with some embodiments. The HE AP 502 may act as the sensor hub 510 in accordance with some embodiments. The IoT device 508 may have identifiers that identify a type of data that is measured from the sensors. In some embodiments, the IoT device 508 may be able to determine a location of the IoT device 508 based on received satellite signals or received terrestrial wireless signals.

In some embodiments, at least some of the IoT devices 508 need to consume very low average power in order to perform a packet exchange with the sensor hub 510 and/or access gateway 512. The IoT devices 508 may be densely deployed.

The IoT devices 508 may enter a power save mode and may exit the power save at intervals to gather data from sensors and/or to upload the data to the sensor hub 510 or access gateway 512.

In some embodiments, the HE AP 502 HE stations 504, legacy stations 506, IoT devices 508, access gateways 512, Bluetooth™ devices, and/or sensor hubs 510 enter a power save mode and exit the power save mode periodically or at a pre-scheduled times to see if there is a packet for them to be received. In some embodiments, the HE AP 502, HE stations 504, legacy stations 506, IoT devices 508, access gateways 512, Bluetooth™ devices, and/or sensor hubs 510 may remain in a power save mode until receiving a wake-up packet.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 ax embodiments, a HE AP 502 may operate as a HE AP which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE trigger frame, which may be a trigger packet or HE control and schedule transmission, at the beginning of the HEW control period. The HE AP 502 may transmit a time duration of the TXOP and sub-channel information. During the HE control period, HEW stations 504 may communicate with the HE AP 502 in accordance with a non-contention based multiple access technique such as OFDMA or MU-MIMO.

This is unlike conventional wireless local-area network (WLAN) communications in which devices communicate in accordance with a contention-based communication technique, rather than a multiple access technique. During the HE control period, legacy stations refrain from communicating.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In some embodiments, the HE station 504 and/or HE AP 502 may be configured to operate in accordance with IEEE 802.1 lmc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502. In example embodiments, the radio architecture of FIG. 1, the front-end module circuitry of FIG. 2, the radio IC circuitry of FIG. 3, and/or the base-band processing circuitry of FIG. 4 may be configured to perform the methods and functions herein described in conjunction with FIGS. 1-18.

In example embodiments, the HE AP 502 may also communicate with legacy stations 506, sensor hubs 510, access gateway 512, and/or HE stations 504 and may include one or more of the following: the radio architecture of FIG. 1, the front-end module circuitry of FIG. 2, the radio IC circuitry of FIG. 3, and/or the base-band processing circuitry of FIG. 4.

The HE AP 502 may also communicate with legacy stations 506, sensor hubs 510, access gateway 512, and/or HE stations 504 in accordance with legacy IEEE 802.11 communication techniques. In example embodiments, a HE AP 502, access gateway 512, HE station 504, legacy station 506, IoT devices 508, and/or sensor hub 510 may be configured to perform the methods and functions herein described in conjunction with FIGS. 1-18. In example embodiments, an apparatus of a HE AP 502, an apparatus of an access gateway 512, an apparatus of a HE station 504, an apparatus of a legacy station 506, apparatus of an IoT devices 508, and/or an apparatus of a sensor hub 510 may be configured to perform the methods and functions herein described in conjunction with FIGS. 1-18.

The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Figure 6:
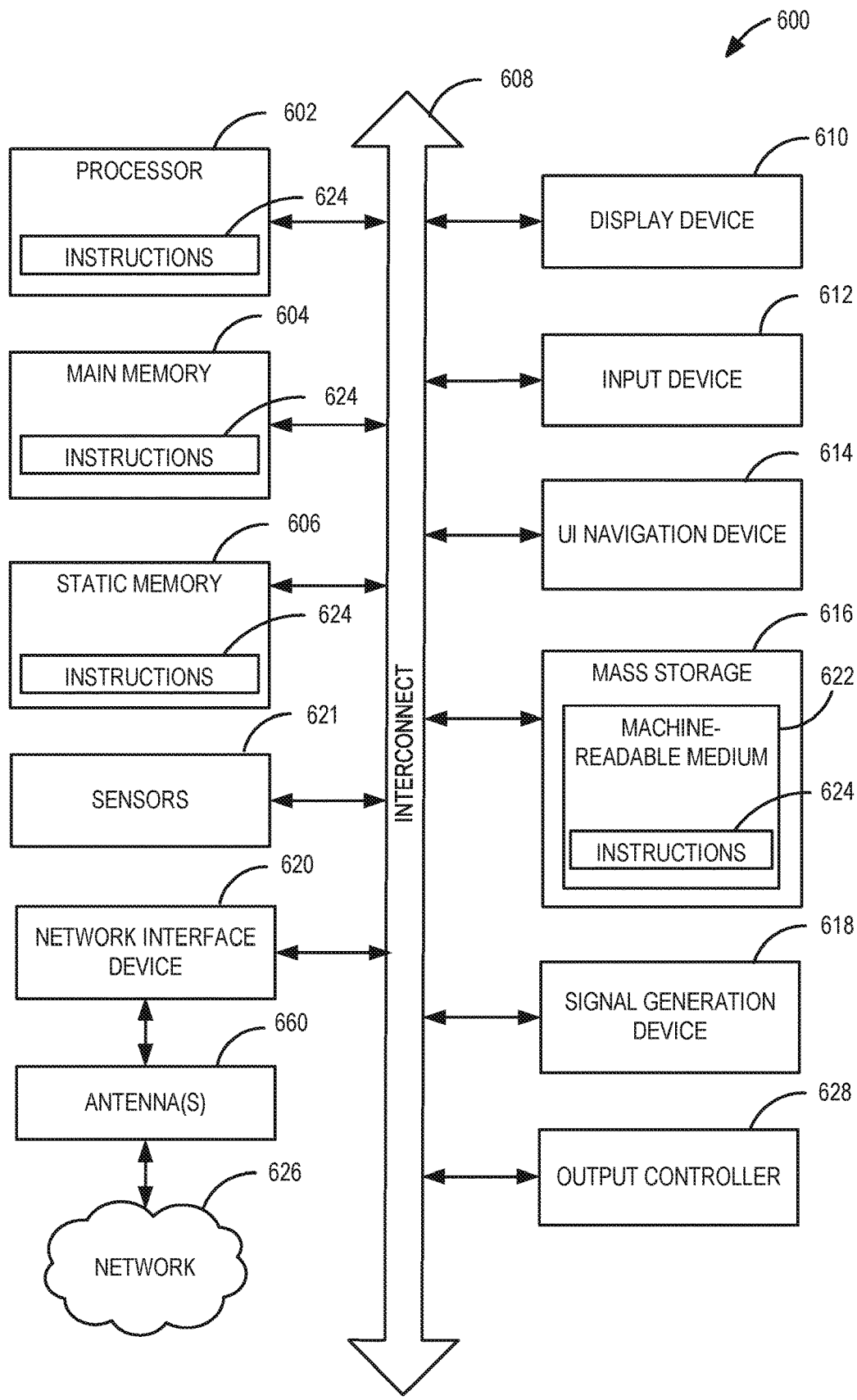
FIG. 6 illustrates a block diagram of an example machine upon which any one or more of the operations/techniques (e.g., methodologies) discussed herein may perform.

FIG. 6 illustrates a block diagram of an example machine 600 upon which any one or more of the operations/techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment.

The machine 600 may be a HE STAs 504 (FIG. 5), HE AP 502, IoT device 508, sensor hub 510, access gateway 512, or wireless device 700. The machine 600 may be personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
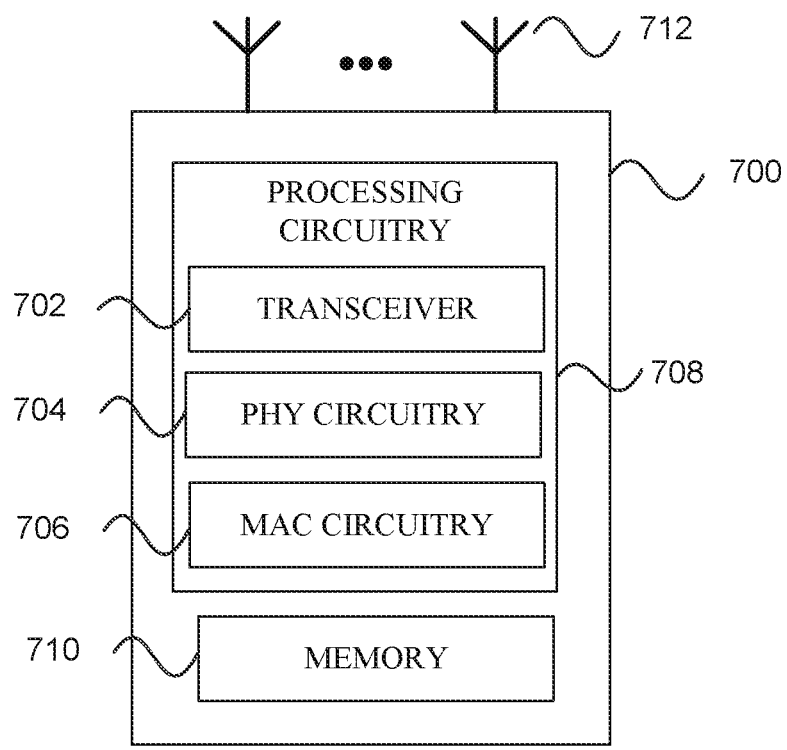
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 800 may be one or more of HE STAs 504 (FIG. 5), HE AP 502, IoT device 508, sensor hub 510, example machine 600, or access gateway 512.

HE STAs 504 (FIG. 5), HE AP 502, IoT device 508, sensor hub 510, machine 600, or access gateway 512 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE STAs 504 (FIG. 5), HE AP 502, legacy device 506, IoT device 508, sensor hub 510, machine 600, or access gateway 512) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11 and/or Bluetooth). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE STAs 504 (FIG. 5), HE AP 502, legacy device 506, IoT device 508, sensor hub 510, machine 600, or access gateway 512), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

Figure 8:
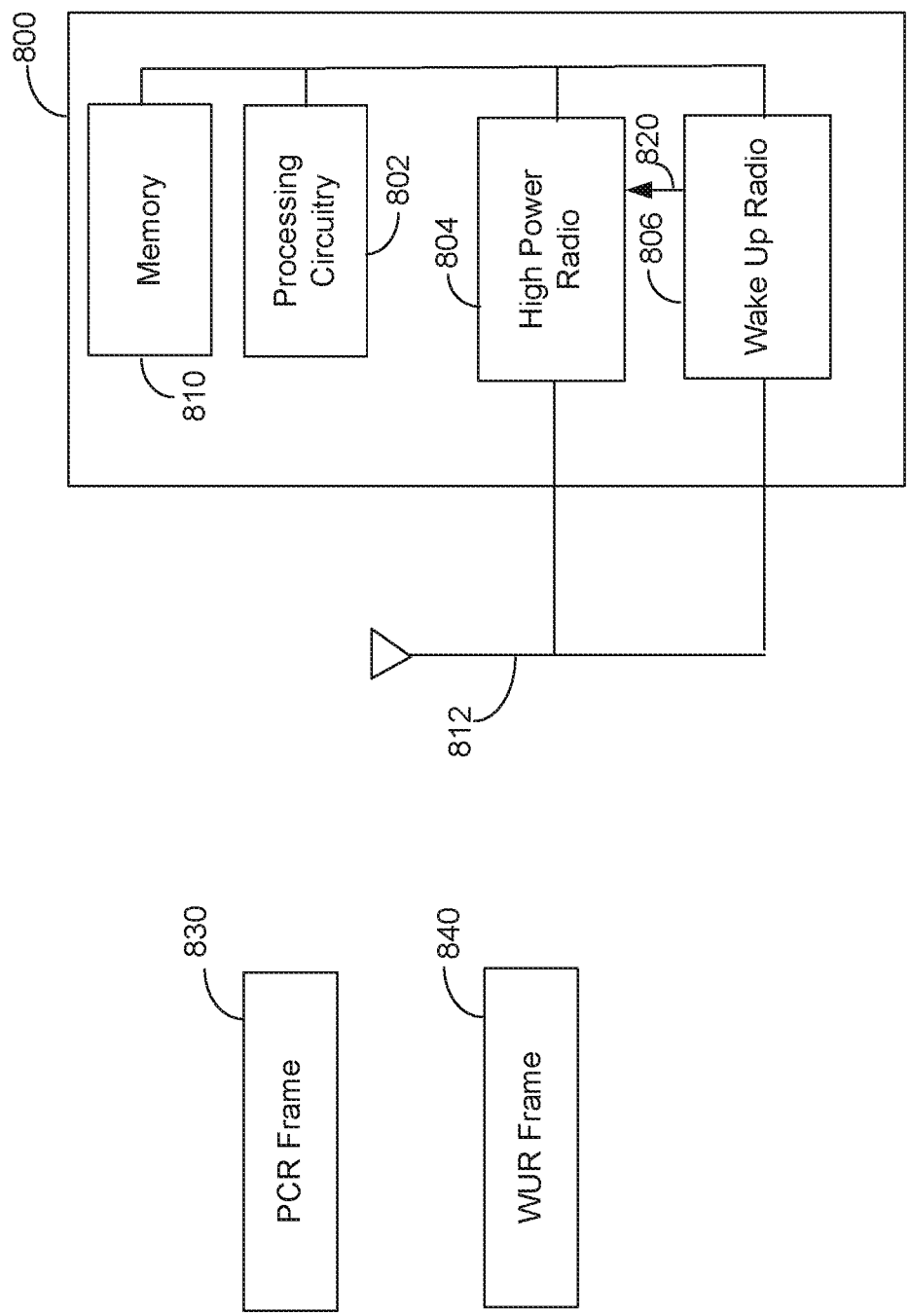
FIG. 8 illustrates a block diagram of an example wireless device upon which any one or more of the techniques (e.g., methodologies or operations) discussed herein may perform.

FIG. 8 illustrates a block diagram of an example wireless device 800 upon which any one or more of the techniques (e.g., methodologies or operations) discussed herein may perform. The wireless device 800 may be a HE device. In some embodiments, the wireless device 800 may be configured to conform to the 802.11 ba standards. The wireless device 800 may be one or more of HE STAs 504 (FIG. 5), HE AP 502, IoT device 508, sensor hub 510, example machine 600, or access gateway 512.

HE STAs 504 (FIG. 5), HE AP 502, IoT device 508, sensor hub 510, machine 600, or access gateway 512 may include some or all of the components shown in FIGS. 1-8. The wireless device 800 may be an example machine 600 as disclosed in conjunction with FIG. 6.

The wireless device 800 may include processing circuitry 802. The processing circuitry 802 may be operably coupled to one or more primary connectivity radios (PCRs) 804. The PCR 804 may be operable to transmit and receive data over a wireless network via one or more antennas 812. The PCR 804 may enable communication with one or more other wireless devices 700 or 800 (e.g., HE STAs 504 (FIG. 5), HE AP 502, legacy device 506, IoT device 508, sensor hub 510, machine 600, or access gateway 512) using the one or more antennas 812. Some combination of the processing circuitry 802 and PCR radio 804 may include PHY circuitry to perform various encoding and decoding functions that may include formation of baseband signals for transmission and decoding of received signals. As another example, the PCR radio 804 may perform various transmission and reception functions such as conversion of signals between a baseband range and a RF range.

The wireless device 800 may also include memory 810 arranged to perform the operations described herein (e.g., some of the operations described herein may be performed by instructions stored in the memory 810).

The antennas 812 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 812 may be effectively separated to take advantage of spatial diversity and the different channel characteristics that may result.

The wireless device also includes a wake-up radio (WURx) 806. The WURx 806 may be configured to operate at a substantially reduced power consumption relative to the PCR radio 804. The WURx 806 may be configured to receive a wake-up signal and to transmit an indication 820 to the PCR 804 and/or the processing circuitry 802. For example, in some aspects, one or more of the processing circuitry 802 and PCR 804 may transition from an awake or fully operable state to enter a low power or doze state, resulting in an inability for the device 800 to receive information via the PCR 804. The WURx 806 may remain operable during this low power or doze state, and may receive low power wake-up signals from another device, such as an access point. Upon receiving a wake-up signal, the WURx 806 may signal the PCR 804 and/or the processing circuitry 802 to transition from the low power or doze state to a higher power, fully operable or awake state.

One or more of the memory 810, the processing circuitry 802, PCR 804, and WURx 806 may be coupled with one another. Moreover, although memory 810, processing circuitry 802, PCR 804, WURx 806, and antennas 812 are illustrated as separate components, one or more of memory 810, processing circuitry 802, PCR 804, WURx 806, and antennas 812 may be integrated in an electronic package or chip.

In some embodiments, the wireless device 800 may be a mobile device as described in conjunction with FIG. 6. In some embodiments, the wireless device 800 may be configured to operate in accordance with one or more wireless communication standards as described herein (e.g., as described in conjunction with FIGS. 1-6, IEEE 802.11 and/or Bluetooth). In some embodiments, the wireless device 800 may include one or more of the components as described in conjunction with FIG. 6 (e.g., display device 610, input device 612, etc.) Although the wireless device 800 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements.

In some embodiments, an apparatus of or used by the wireless device 800 may include various components of the wireless device 800 as shown in FIG. 8 and/or components from FIGS. 1-7. Accordingly, techniques and operations described herein that refer to the wireless device 800 may be applicable to an apparatus for a wireless device 800 (e.g., HE STAs 504 (FIG. 5), HE AP 502, legacy device 506, IoT device 508, sensor hub 510, machine 600, or access gateway 512), in some embodiments. In some embodiments, the wireless device 800 is configured to decode and/or encode signals, packets, and/or frames as described herein (e.g., PPDUs).

In some embodiments, the MAC circuitry 706 of FIG. 7 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

In some embodiments, the processing circuitry 802 may include one or more processors. The processing circuitry 802 may be configured to perform functions based on instructions being stored in a RAM or ROM, or based on special purpose circuitry. The processing circuitry 802 may include a processor such as a general purpose processor or special purpose processor. The processing circuitry 802 may implement one or more functions associated with antennas 812, the PCR 804, WURx 806, and/or the memory 810. In some embodiments, the processing circuitry 802 may be configured to perform one or more of the functions/operations and/or methods described herein.

FIG. 8 also shows a primary connectivity radio (PCR) frame 830 and a WUR frame 840. The PCR frame 830 may be encoded so as to be received by a primary connectivity radio, such as the radio 804. The WUR frame 840 may be encoded so as to be received by a low power wake-up radio, such as WURx 806. Types for the WUR frame 840 include a wake-up packet or wake-up frame, and a WUR beacon.

Figure 9:
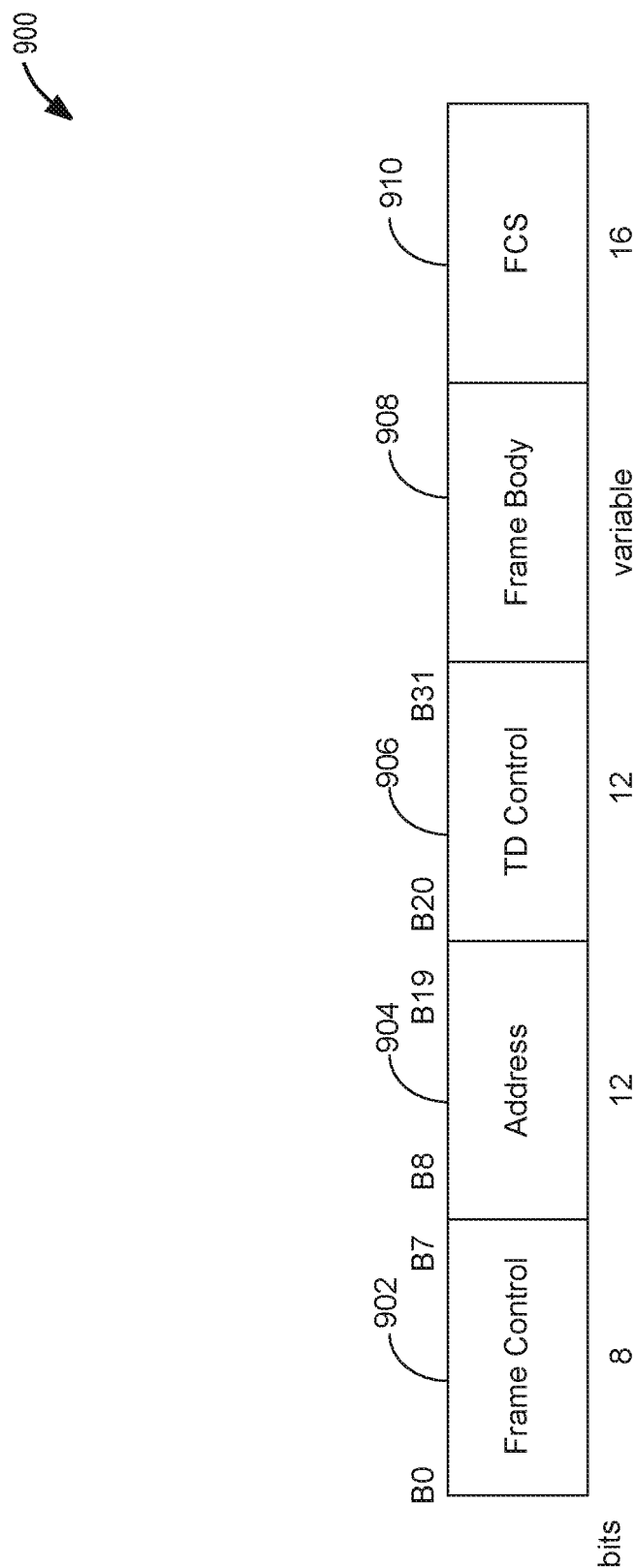
FIG. 9 shows an example WUR frame format.

FIG. 9 shows an example WUR frame format. The WUR frame 900 may be configured to be received by the low power WURx 806. The frame 900 includes a frame control field 902, destination address field 904, TD control field 906, frame body 908, and a frame check sequence (FCS) field 910.

Figure 10:
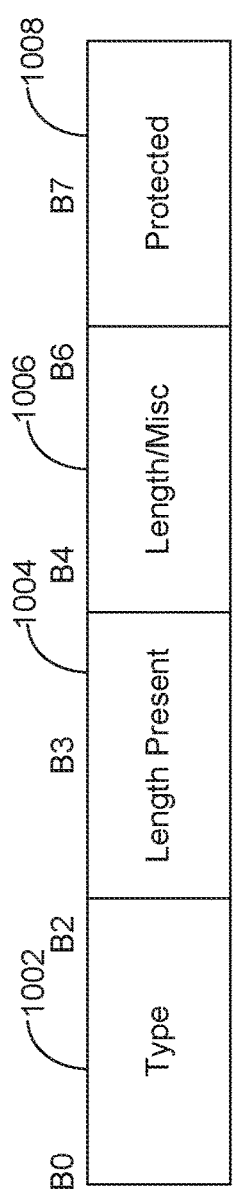
FIG. 10 is an example of a WUR frame control field.

FIG. 10 is an example of a WUR frame control field. The WUR frame control field 902 includes a type field 1002, length present field 1004, length misc field 1006, and a protected field 1008.

FIG. 11 shows one embodiment of defined values for the type field 1002. Possible values are shown in column 1102 and the associated meaning is shown in column 1104.

One technical problem associated with wake-up frames is that without security, the wake-up frame could be replicated by a nefarious device operating on the wireless network. This could prevent devices from entering a low power state, potentially depleting their battery power and causing them to become inoperative. One technical solution to this problem is to provide for an authentication procedure when receiving a WUR frame. In some aspects, the FCS field 910 is a message integrity code (MIC) field. In some aspects, this may be conditioned on whether the protected field 1008 is set. In some aspects, the FCS field 910 stores a cyclic redundancy code (CRC) if the protected bit 1008 in the frame control field 902 is clear (set to zero.)

A method for computing a MIC field (e.g. 910) is common between a transmitting device and a receiving device. This allows the receiver to ignore frames received that do not have a proper MIC field value. Some embodiments may use BIP-CMAC-128 to compute a value for the MIC field.

To prevent a replay attack, a counter may be carried in a WUR frame, and thus be included in the determination of a MIC value. The BIP algorithm uses IPN (IGTK (integrity group temporal key) packet number) with a size of six (6) bytes. Six (6) bytes may be too large for WUR frames, given the data rate can be either 62.5 kbps or 250 kbps.

Authentication of a WUR frame may be implemented via a variety of methods in the disclosed embodiments. In a first embodiment, a counter or packet number with a size smaller than six (6) bytes is carried in a WUR frame that requires authentication. In a second option, a partial TSF with a size smaller than six bytes is carried in the WUR frame. In these embodiments, the partial TSF is used as a counter to cause variation in the MIC and reduce the probability that a WUR frame may be successfully duplicated by a nefarious device.

Figure 12:
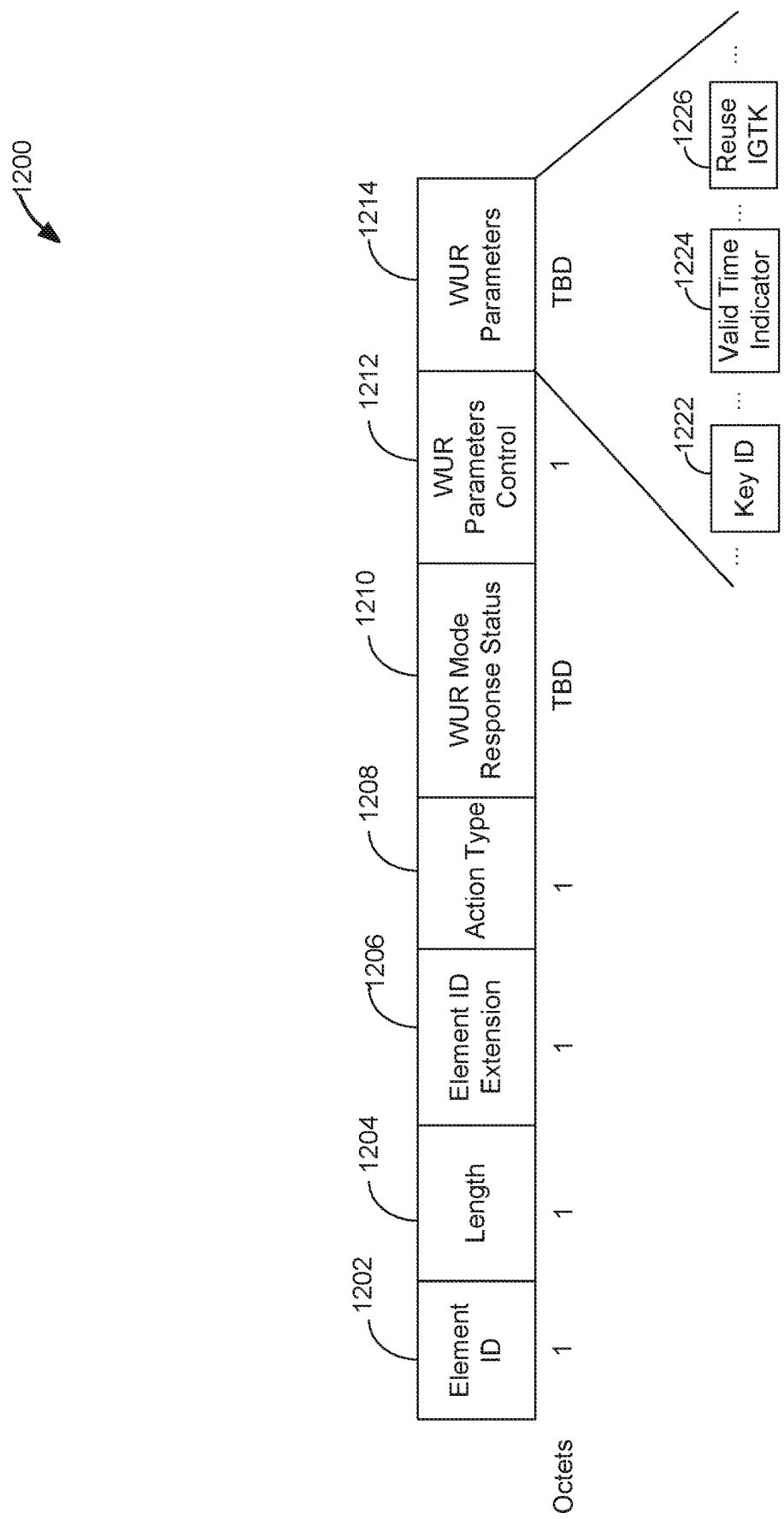
FIG. 12 shows an example embodiment of a WUR Mode element.

FIG. 12 shows an example embodiment of a WUR Mode element. The WUR mode element is used to negotiate parameters related to WUR operation. The WUR mode element 1200 includes an element ID field 1202, length field 1204, element id extension 1206, an action type 1208, a WUR mode response status 1210, a WUR parameters control field 1212, and a WUR parameters field 1214.

Figure 13:
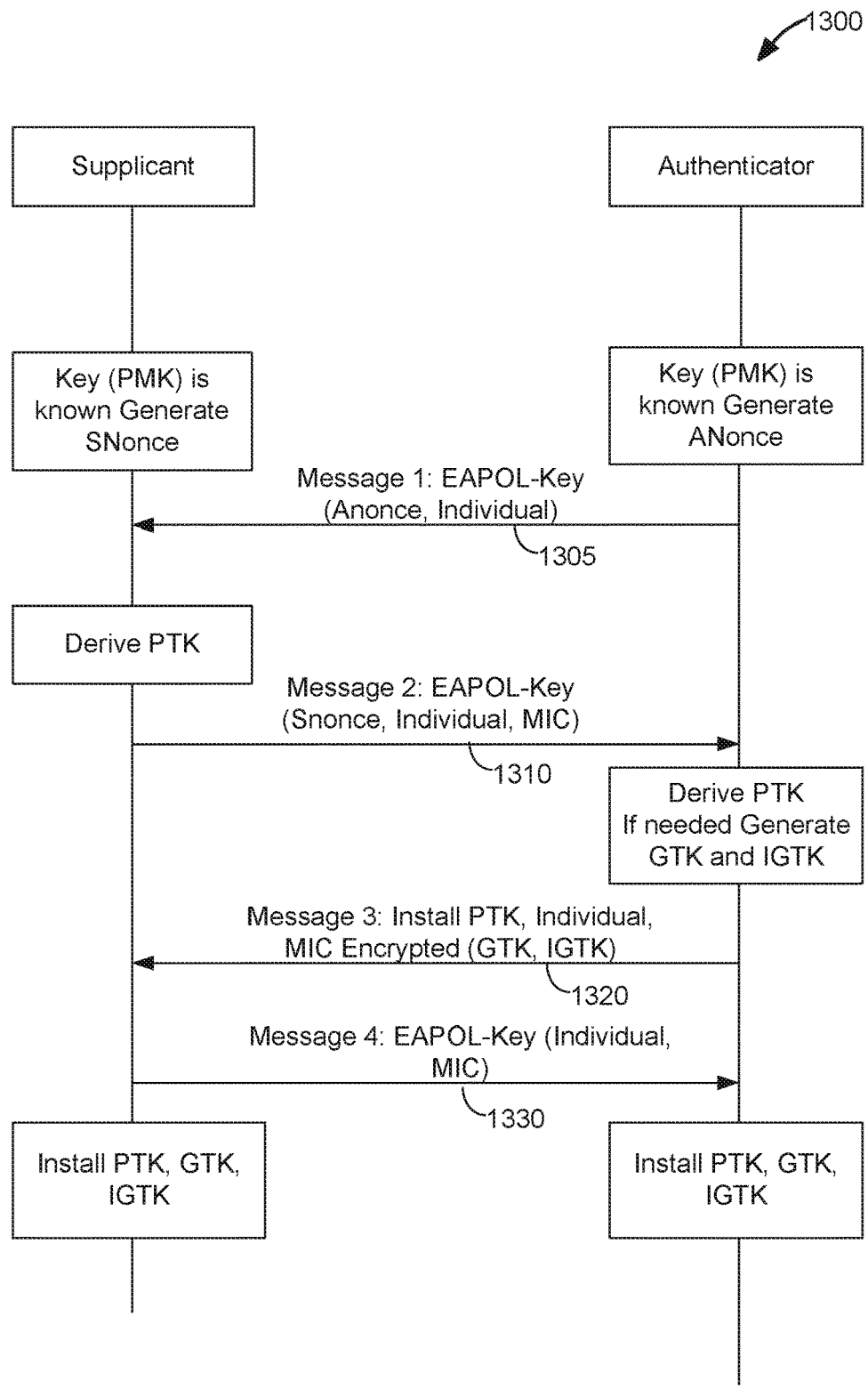
FIG. 13 shows a four-way handshake protocol performed between an access point and a station in at least one of the disclosed embodiments.

FIG. 13 shows an example of a four way handshake protocol 1300 performed between an access point and a station in at least one of the disclosed embodiments. An association process between a station and an access point utilizes the four way handshake protocol 1300. As a result of a completion of the four-way handshake 1300, both the AP and the STA obtain a transient key (TK) that is unique for each device. The TK is used for encrypting/decrypting unicast traffic between the AP and STA. Either temporal key integrity protocol (TKIP)/counter mode with cipher-block chaining message authentication code protocol (CCMP) or Galois/counter mode protocol (GCMP) cipher suite may be used.

Before beginning the four way handshake 1300, both an access point and a station have a pairwise master key (PMK). The AP and STA both generate a random sequence. The AP's random sequence is described as an ANonce and the STA's random sequence is referred to as an SNonce. The AP sends the ANonce to the STA in message 1305. When the STA receives the ANonce, the STA now has both the SNonce and the ANonce, a station address for the STA and a station address for the AP. The STA generates a pairwise transient key (PTK) based on the ANonce, SNonce, and two station addresses. The STA sends the SNonce to the AP in message 1310, along with a MIC value. In some embodiments, the MIC value included in message 1310 may be generated based on the function MIC (key confirmation Key EAPOL), which may be computed over the body of the EAPOL key frame of message 1310 with the key MIC field initially set to zero.

Upon receiving the message 1310, the AP verifies the MIC and generates a PTK. The AP may then send a message 1320 to the STA. The message 1320 indicates that the STA should install the PTK. The AP may also send a GTK in message 1320. A GTK (Group Temporal Key) is shared by STAs associated with an AP and is used by the AP to encrypt data. The associated STAs use the GTK for decrypting Group-addressed traffic using TKIP/CCMP or the GCMP cipher suite.

The AP may also send a receive sequence counter for the GTK key. A second MIC is computed for the EAPOL frame 1320 and included in the message 1320. In addition, the AP may provide the STA with an integrity group temporal key (IGTK) in the message 1320.

The IGTK is used by AP and STAs for calculating a MIC value for a Group-addressed Management Frame, using CMAC or GMAC cipher suite. The AP and STAs hold up to 3 GTK values (with matching Key IDs 1, 2 & 3) and 2 IGTK values (with matching Key IDs 4 & 5).

Upon receiving the message 1320, the STA verifies the second MIC and sends message 1330 to the AP. The message 1330 includes a third MIC.

Upon receiving message 1330, the AP may verify the third MIC and install the PTK and GTK. The AP may open a data port to facilitate unicast data between the AP and STA using the temporal keys and the PTK and multicast data using the GTK.

Since both the GTK and IGTK are shared with associated STAs, the AP typically updates the GTK and IGTK at least when an STA disassociates from the AP. When the AP updates the IGTK, a GTK Rekeying process is employed to update all the associated STAs (one at a time) on the new IGTK value. This process includes providing associated STAs (one by one, i.e. using unicast GTK Rekeying messages per STA) with a new value for one of the non-used GTKs and a new value for the non-used IGTK.

For example, if a first GTK having a key ID value of two (2) is currently active, the AP may update associated STAs with a new GTK having a key ID value of three (3). If a IGTK value having a key ID of four (4) is currently active, the AP may update associated STAs to have a new IGTK value with a key ID of five (5). Once the associated STAs have been updated, the AP will begin using the new Key IDs.

Some disclosed embodiments provide multiple key identifiers for different keys. In a first embodiment, WUR authentication can use a key ID of an IGTK exchanged during the four way handshake. In these embodiments, the same IGTK is used for both primary connectivity radio and wake-up radio communications. Thus, the latest IGTK may be used for WUR communications in this embodiment. In this embodiment, a key identifier may be included in an authenticated WUR frame to differentiate multiple IGTKs during an integrity key update.

In some embodiments, the key identifier may be included in the misc field 1006. Alternatively, the key identifier may be included in the frame body field 908. In some other aspects, the key identifier may be carried in the TD control field 906. In some aspects, an entire key identifier may not be included, in the WUR frame. Instead, only a single (low order) bit of the key identifier may be included in the WUR frame. For example, a predetermined mapping between binary values and key ids may indicate the key. In other words, a first binary value may identify a first key ID, and a second binary value may identify a second key id. Alternatively, a partial key id, including less than all bits of a complete key ID may be used. For example, three least significant bits of a key identifier may be used. In some aspects, most significant bits of the key identifier that are zero may not be included in the frame. By using less than a full size key identifier, the resulting size of the WUR frame may be reduced, which can be important when transmitting a message to a wake-up radio.

In some aspects, an indicator of a WUR authentication key identifier is included in a WUR action frame (e.g. 1200). Later, when a second WUR frame (authenticated) is received, such as a wake-up frame, the WURx (e.g. 806) may use the key identifier previously indicated in the previously received WUR action frame.

In some embodiments, an access point may set a mode element field in the WUR parameters field 1212 to indicate a key ID 1222 used for WUR authentication during a negotiation process with a WUR STA. In some aspects, a second field 1224 may accompany the key ID field to indicate a time when the key ID may be used. For example, in some aspects, the key id 1222 specified in the WUR parameters field 1212 may be a next key to be active, after an existing key expires. If the field 1224 is not present, or set to a defined value, then the key ID 1222 can represent a key available for use immediately. With this option, the STA only needs to maintain one key when the STA enters a doze state.

In other embodiments WUR frame authentication may use a key that is separate and distinct from keys generated via the four way handshake described above with respect to FIG. 12. For purposes of this disclosure, this new key is referred to as a WUR IGTK. Some embodiments may utilize the four-way handshake or FT 4-way handshake utilizing EAPOL-Key frames as shown in FIG. 13. Message 1320 may be enhanced to include the WUR IGTK.

Figure 14:
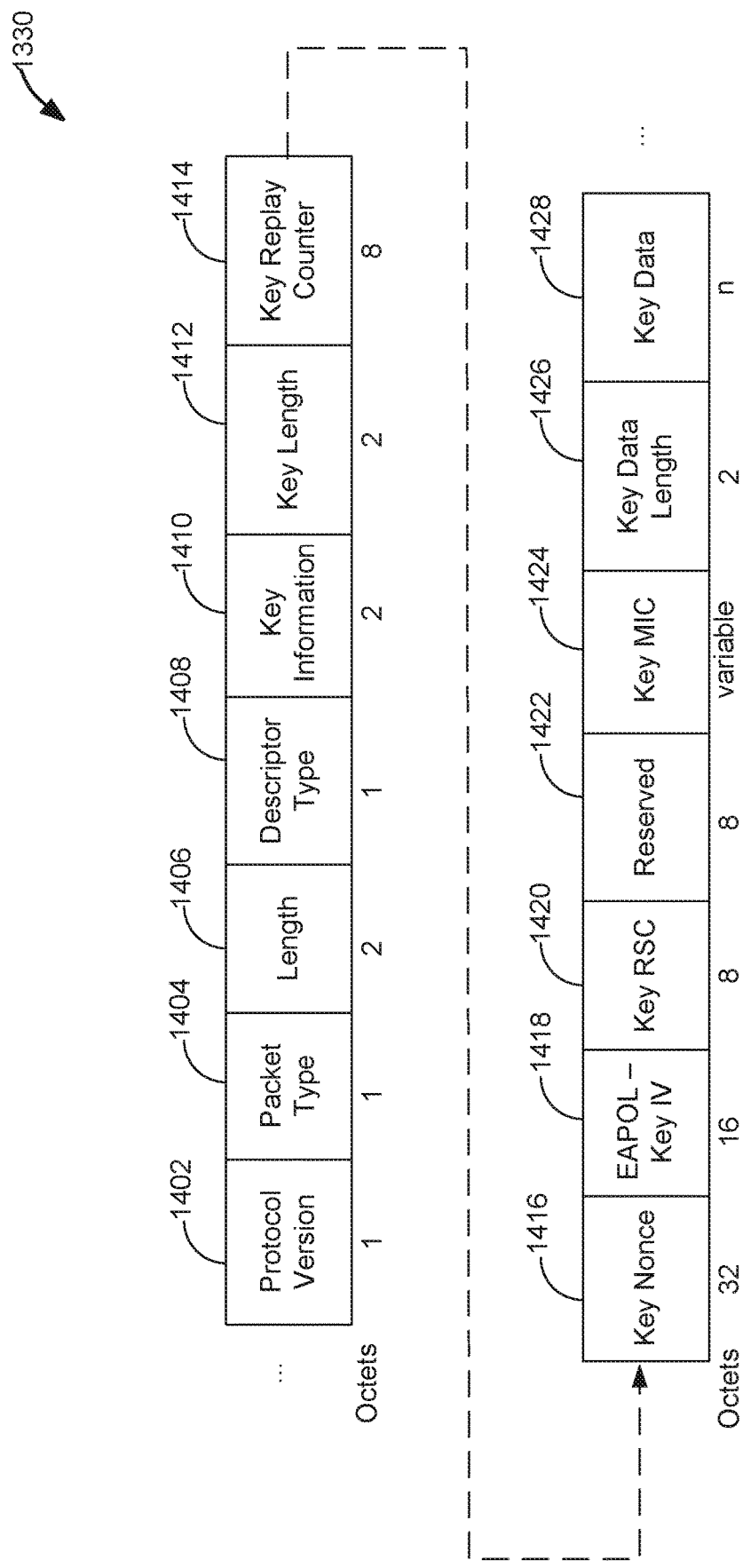
FIG. 14 shows an example format of a EAPOL-Key frame.

FIG. 14 shows an example format of a EAPOL-Key frame, such as the frame 1320 described above with respect to FIG. 13. The EAPOL-Key frame 1330 includes a protocol version field 1402, packet type field 1404, length field 1406, descriptor type field 1408, key information field 1410, key length field 1412, key reply counter field 1414, key nonce field 1416, EAPOL-Key IV field 1418, KEY RSC field 1420, reserved field 1422, key MIC field 1424, key data length field 1426, and key data field 1428.

To include a WUR IGTK in message 1320 of 4-way handshake 1300, a WUR IGTK key data cryptographic encapsulation (KDE) format message can be included in the key data field 1428 of message 1320 of FIG. 13.

Figure 15:
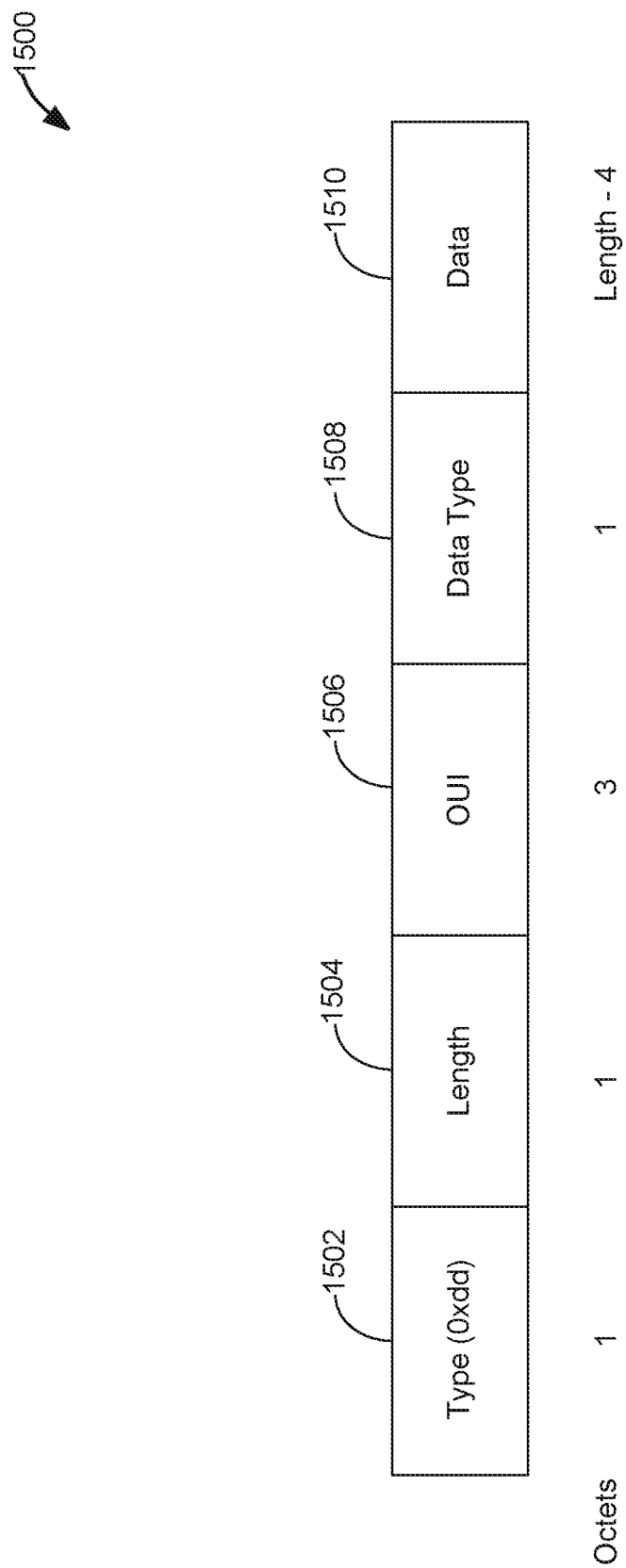
FIG. 15 shows an example format of a KDE.

FIG. 15 shows an example format of a KDE format message. The KDE format message 1500 includes a type field 1502, length field 1504, OUI field 1506, data type field 1508, and a data field 1510. A particular predefined value in the data type field 1508 identifies the KDE as a WUR IGTK KDE.

FIG. 16 shows assignments of data type field 1508 values. In some aspects, a value to indicate a WUR IGTK KDE may be selected from any of values 13-255.

Figure 17A:
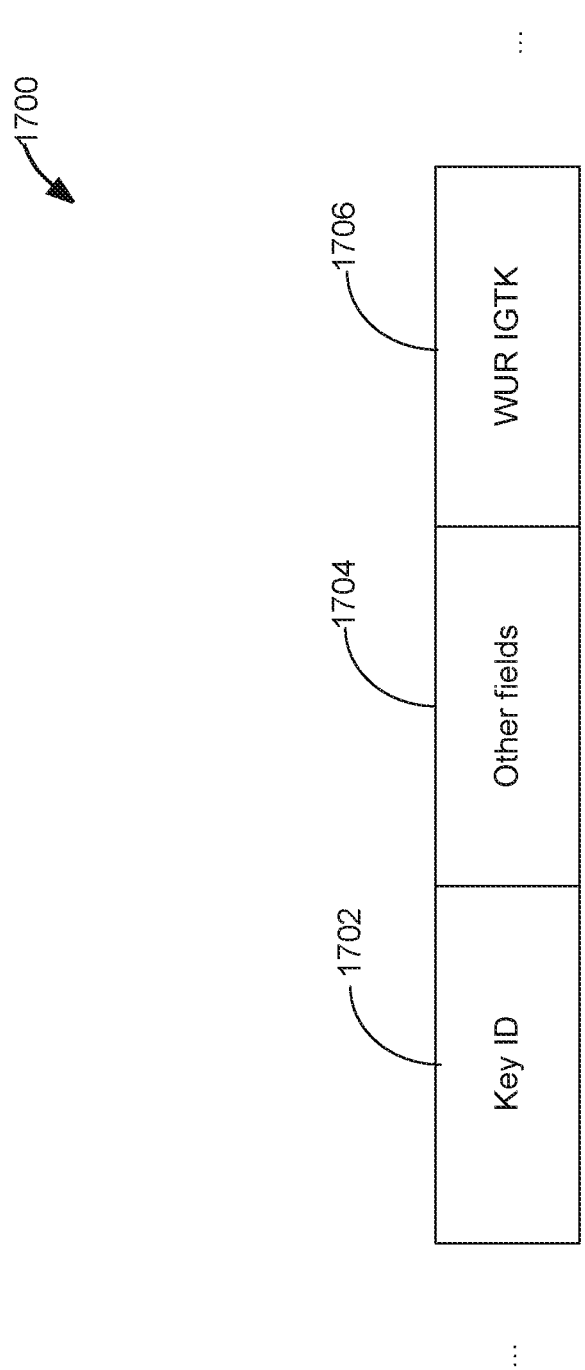
FIG. 17A shows an example of at least a portion of a WUR IGTK KDE.

FIG. 17A shows an example of at least a portion of a WUR IGTK KDE. The WUR IGTK KDE 1700 may be stored in the data field 1510 of the WUR IGTK KDE 1500. The WUR IGTK KDE 1700 includes a key id field 1702, other fields 1704, and a WUR IGTK field 1706. The key id field 1702 stores an identifier of the WUR IGTK 1706. The key id 1702 may be used to differentiate different WUR IGTK exchanged between an AP and an STA. In some aspects, the WUR IGTK field 1706 has a size of 128 bits. The other fields 1704 can include a packet number if a packet number is used in the WUR frame for authentication.

In embodiments that provide for both reuse of the same IGTK for both WUR frame authentication and authentication of other frames, or a separate IGTK for WUR authentication, it may be necessary to differentiate, at run time, which method to employ. In some aspects, if a second IGTK is not received during the four way handshake process described above, then the implementations may use the same IGTK for WUR authentication and authentication of PCR frames.

In some other embodiments, a bit or series of bits in the WUR parameters field of the WUR mode element indicates if a IGTK is reused for both WUR communications and communications with a primary connectivity radio.

Figure 17B:
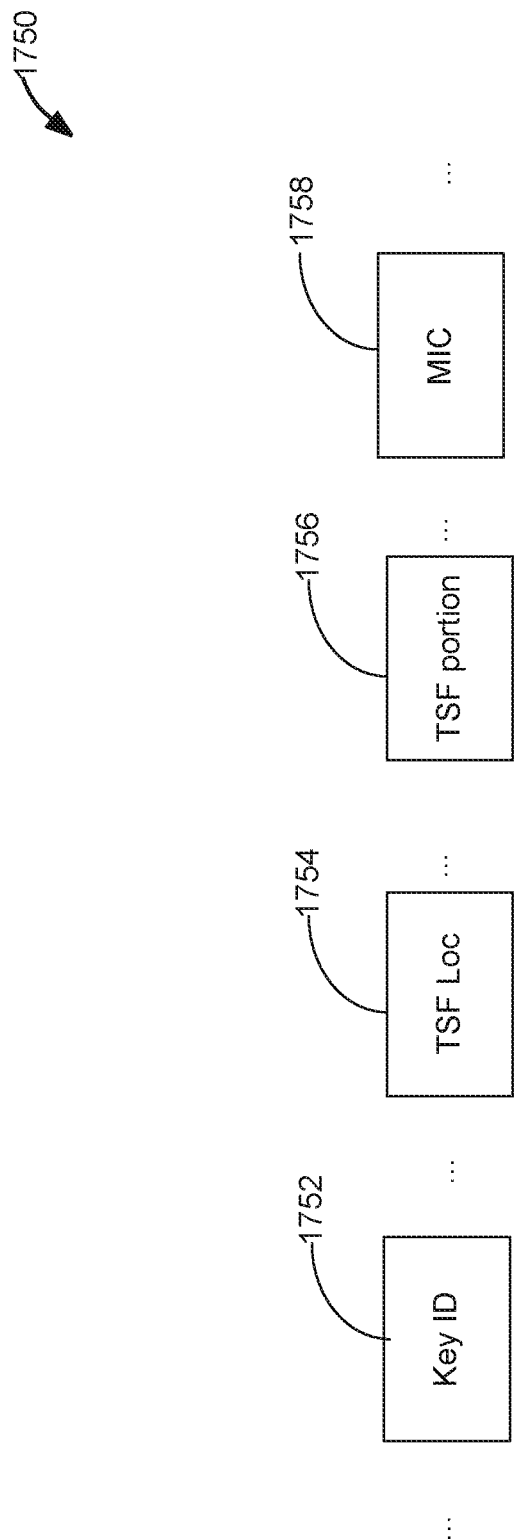
FIG. 17B shows a portion of a WUR frame that may be implemented in one or more of the disclosed embodiments.

FIG. 17B shows a portion of a WUR frame that may be implemented in one or more of the disclosed embodiments. The WUR frame portion 1750 includes a key identifier 1752, TSF location indicator 1754, a TSF portion 1756, and a message integrity code 1758. In some aspects, the portion 1750 may be included in the WUR frame 900. In some other aspects, the portion 1750 may be included in the WUR frame 1900, with the MIC 1758 equivalent to the MIC 1904. In some aspects, the key identifier may be one, two, or three bits long. In some aspects, none or more of the fields shown in FIG. 17B may be included in a WUR frame. The TSF location field 1754 indicates a location of a TSF portion within the WUR frame itself. In some aspects, the location may be indicated via an offset from a start of the WUR frame.

Figure 18A:
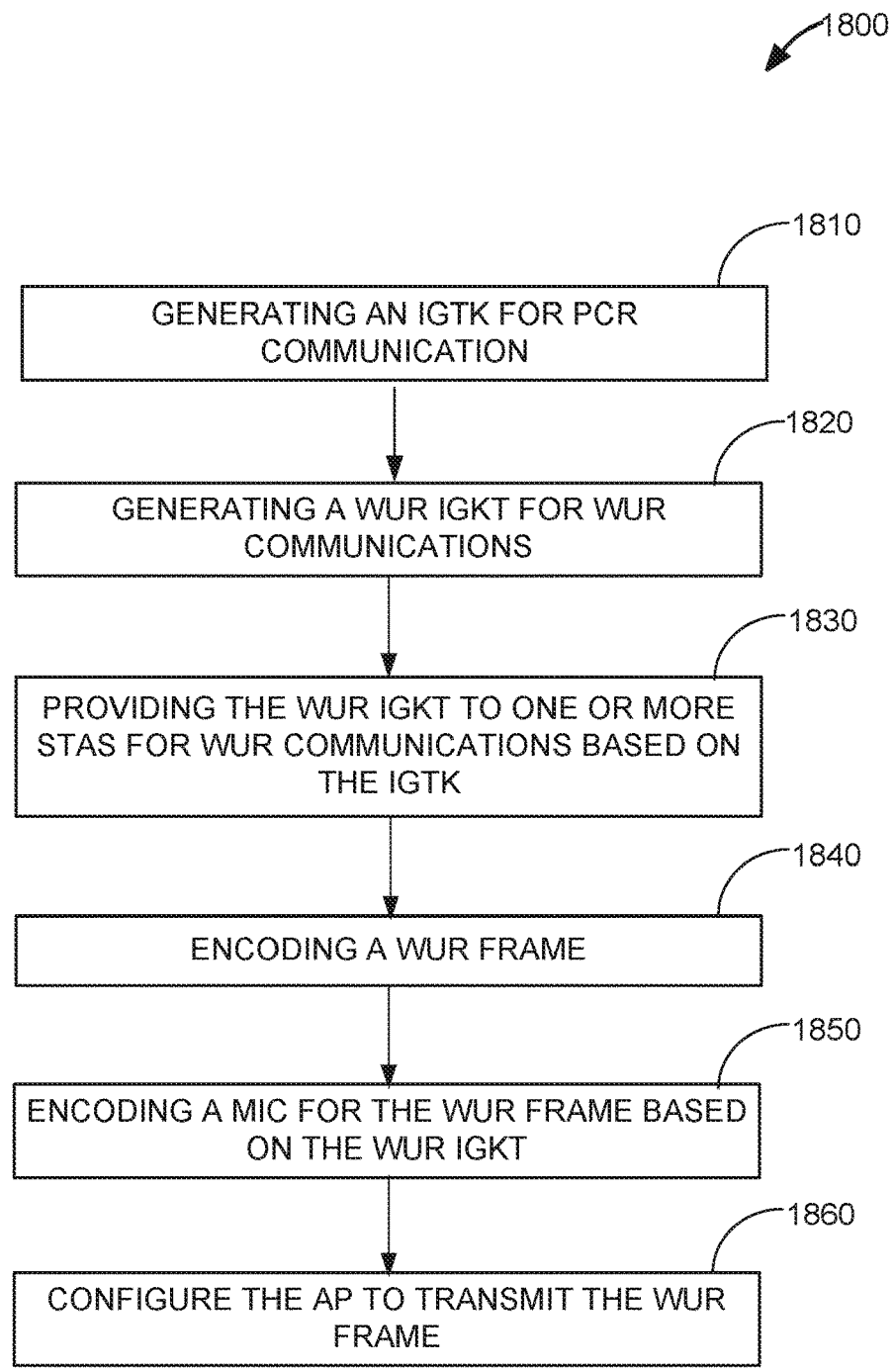
FIG. 18A is a flowchart for generating and transmitting a WUR wake-up frame.

FIG. 18A is a flowchart for generating and transmitting a WUR wake-up frame. One or more of the functions discussed below with respect to FIG. 18A may be performed by hardware processing circuitry. For example, an electronic memory may store instructions that when executed, configure the hardware processing circuitry to perform one or more of the functions discussed below with respect to process 1800 and FIG. 18A. In some aspects, process 1800 may be performed by an access point. The discussion below may refer to a device performing process 1800 as an "executing device."

In operation 1810, a first IGTK is generated for communication over a primary connectivity radio. The first IGTK may be used when a primary connectivity radio of the executing device communicates with another primary connectivity radio of another device, such as a station. In some embodiments, the first IGTK may be used for broadcast/multicast integrity protocol (BIP). Thus, a device performing process 1800 may transmit one or more BIP messages based on the first IGTK. The messages may be transmitted to one or more LP-WUR stations, such as the station 800 discussed above with respect to FIG. 8. A key identifier may be assigned to the first IGTK. In some aspects, the executing device may allocate a first key identifier range to identify keys used for communications using primary connectivity radios of associated stations. This first key identifier range does not overlap with a second key identifier range that is used to allocate key identifiers for keys used for wake-up radio communication, as discussed further below. In some aspects, the first IGTK generated in operation 1810 may be used for BIP communication, as discussed above.

In operation 1820, a wake-up radio (WUR) IGTK is generated for wake-up radio communications. In other words, the WUR IGTK is used for messages transmitted for reception by a WURx of a station (e.g. 806). Operation 1820 may also include assigning a key identifier to the WUR IGTK. In some aspects, the key identifier may be one or more bits long. To save space in a WUR frame, the key identifier may be limited to one bit in length in some embodiments.

In operation 1830, the WUR IGTK is provided to one or more stations for use in wake-up radio communications. The WUR IGTK is provided using the primary connectivity radio of the AP and of the stations to which it is associated.

In operation 1840, a wake-up radio frame is encoded. The wake-up radio frame may be a wake-up frame, or it may be another frame, such as a WUR beacon, or a WUR configuration message.

In operation 1850, a message integrity code for the wake-up radio frame is determined based on the WUR IGTK. For example, in some aspects, a process as described with respect to FIG. 21 below may be used to generate the MIC. Operation 1850 may include writing the determined MIC into the wake-up radio frame. In some aspects a key identifier for the key used to generate the MIC may be included in the WUR frame.

In operation 1860, the executing device is configured to transmit the WUR frame. For example, the application processor 111 may notify baseband processing circuitry 108 that the WUR frame is ready for transmission. In some aspects, control logic 406 may notify baseband circuitry 404 that the WUR frame is ready for transmission.

Thus, in some embodiments, a device performing process 1800 may be configured to communicate with a LP WUR STA that is in a high power or awake state (e.g. operating its primary connectivity radio 804 for communications) using the first IGTK. When the LP-WUR STA is in a low power state, such that the PCR 804 is inoperative, the executing device may encode and transmit one or more WUR frames using the WUR IGTK. In some cases, a WUR frame may be transmitted to a LP-WUR when the device is in an awake state and operating its PCR. However, these frames may be addressed to or encoded for the LP-WUR STAs WURx (e.g. 806). For example, a WUR beacon frame may be encoded using the WUR IGTK, even if the WUR STA is operating in an awake state at the time the WUR beacon is sent. Thus, frames addressed to a PCR of a LP-WUR STA may use the first IGTK, while frames addressed to or encoded for a low power radio of the LP-WUR STA may use the WUR IGTK.

The executing device may periodically, or at other times, update the IGTK and/or the WUR IGTK. Updating the one or more keys includes generating a new key value and assigning a key identifier value for each of the new keys. As discussed above, these new key identifier values may be allowed from distinct key identifier ranges, to ensure key identifiers cannot identify keys of an incorrect type. The AP may then distribute the new keys and their respective identifiers to its associated stations. Until all associated stations have received the new keys and identifiers, the AP may use the previous keys and identifiers when transmitting broadcast messages to associated stations, since not all stations will have the latest keys and identifiers. Once a key and its identifier has been provided to all associated stations, the AP may safely use that key and identifier for broadcast communications.

In some aspects, the executing device may perform the four way handshake discussed above with respect to FIG. 13 as an authenticator device. Thus, the executing device may provide the IGTK and/or the WUR IGTK to associated stations via the message 1320 as discussed above with respect to FIG. 13.

In some aspects, the executing device may encode a WUR mode element to indicate a mapping between the key identifier and the WUR IGTK. The WUR mode element may be transmitted to the one or more stations. If a key identifier for the WUR IGTK is included in the WUR frame, it may be included based on the mapping between the WUR IGTK and the key identifier. In some aspects, the WUR mode element is further encoded to identify a time period during which a particular key or key identifier is valid. for the including the key identifier in the WUR wake-up frame based on the mapping.

When the AP updates the WUR IGTK, it may use a GTK Rekeying mechanism to provide the associated STAs (one at a time) with a new WUR IGTK value. This may be achieved by first all associated STAs (one by one, i.e. using unicast GTK Rekeying messages on a new value for the non-used WUR IGTK. For example, if a WUR IGTK having a key ID equal to six (6) is currently active, the AP may update associated STAs to provide a new WUR IGTK value having a key ID equal to 7. Once the new non-active WUR IGTK (e.g., Key ID 7) has been provided to the associated STAs, the AP will start using the new Key IDs as the 'active' WUR IGTK when transmitting protected WUR frames. These WUR frames may indicate the new key ID (e.g. 7) in the frames themselves, as previously discussed. With this approach, AP may enable the new key by sending a new WUR action frame with key ID information to each non-AP STA, indicating that the new key ID is active, and or a time period during which the new key ID is active.

Figure 18B:
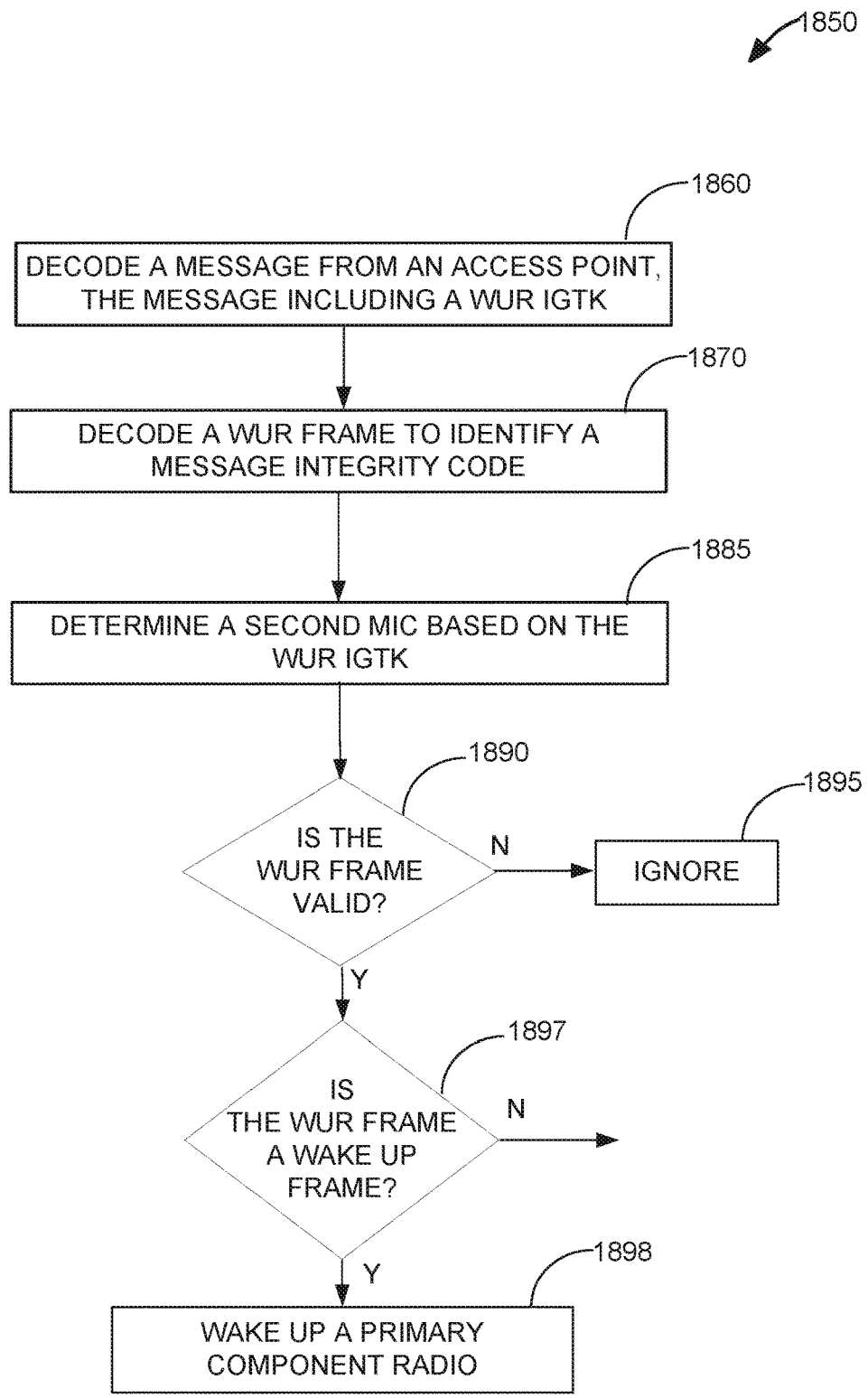
FIG. 18B is a flowchart for receiving a WUR wake-up frame.

FIG. 18B is a flowchart for receiving a WUR wake-up frame. One or more of the functions discussed below with respect to FIG. 18B may be performed by hardware processing circuitry. For example, an electronic memory may store instructions that when executed, configure the hardware processing circuitry to perform one or more of the functions discussed below with respect to process 1850 and FIG. 18B. In some aspects, process 1850 may be performed by a non-AP STA. In some aspects, portions of process 1850 may be performed by first processing circuitry while other portions are performed by second, different processing circuitry. For example, a non-AP STA may include baseband circuitry or a general purpose processor that comprises the first processing circuitry. The non-AP STA may also include a low power wake-up radio, and/or other processing circuitry interfacing with the low power wake-up radio, one or more of which may comprise the second processing circuitry. The discussion below may refer to a device performing process 1850 as an "executing device."

In operation 1860, a message from an access point is decoded. The message includes a WUR IGTK. As discussed above with respect to FIG. 13, a non-AP STA may participate in a 4 way handshake as a supplicant device. During the four way handshake, the non-AP STA may obtain one or more IGTKs. For example, the non-AP STA may receive, from the AP, a IGTK for use in communications with its primary connectivity radio, and a second IGTK, referred to herein as a WUR IGTK, which is used for validating WUR frames.

In operation 1870, a WUR frame is decoded. In some aspects of operation 1870, the WUR wake-up frame is received via a low power wake-up radio, such as the WURx 806 discussed above with respect to FIG. 8. The WUR frame may be a WUR wake-up frame, a WUR beacon, a WUR action frame, or any other type of WUR frame. The WUR frame includes a message integrity code, which is decoded from the frame as part of operation 1870.

In some aspects of operation 1870, a key identifier is decoded from the WUR wake-up frame, and a WUR IGTK is selected based on a mapping of the key identifier to a WUR IGTK. In some aspects, the mapping is established via an exchange of action frames with the authenticator device. For example, a WUR frame may be received prior to the WUR frame decoded in operation 1870 indicating the mapping between key identifiers and IGTKs. (e.g. message portion 1700).

In some aspects, an IGTK used to decrypt the WUR wake-up frame is based on a current time, and valid times associated with multiple IGTKs stored by the station. For example, as described above with respect to FIG. 13, in some aspects, multiple IGTKs may be provided by the authenticator device. Each IGTK may have associated with it, a time period during which the IGTK is valid. Before applying an IGTK to a received WUR frame, the receiving device may determine which of the IGTKs the device has stored are valid at the current time. The currently valid IGTK may then be selected to process the received message. In some aspects, the received WUR frame indicates which IGTK to use for decrypting it. For example, the frame may indicate whether the first or second IGTK is to be applied to the message and to validate the message.

In operation 1885, a second MIC is determined based on the WUR IGTK. In some aspects, the second MIC may be determined according to the process described below with respect to FIG. 21, with the IGTK being used as the key. The second MIC may be determined based on contents of the WUR frame. Decision operation 1890, determines if the received WUR frame is a valid frame. Decision operation 1890 may compare the second MIC determined in operation 1885 based on the WUR IGTK with the MIC included in the WUR frame, and obtained in operation 1870. If the two MICs are equivalent, the WUR frame is considered valid. Otherwise, the WUR frame is invalid, and is ignored in block 1895. If the WUR frame is valid, and the WUR frame is a wake-up frame per decision operation 1897, operation 1898 wakes up a primary radio of the executing device.

Some aspects of process 1850 participate in a four way handshake as a supplicant device. For example, as discussed above with respect to FIG. 13, as part of the four way handshake, a IGTK is received from the authenticator device. In some aspects, the WUR IGTK is also received from the authenticator device during the four way handshake. For example as discussed above with respect to FIG. 13, message 1320 may include two IGTKs in some aspects, one for decrypting of WUR frames and another for decrypting of other frames, such as frames received via a primary connectivity radio. In some aspects, operation 1860 may be performed by processing circuitry 802 and/or the primary connectivity radio or PCR 804.

Process 1850 may include receiving an additional IGTK from the access point for use in PCR communications. In other words, a LP-WUR STA performing process 18050 may use the additional IGTK for communications with the access point using the PCR, and may use the WUR IGTK for communications with the access point using the WURx (e.g. 806). For example, BIP frames received from the access point via the PCR may be decoded based on the additional IGTK. The decoding may compute a MIC value for the BIP frame using the additional IGTK. The MIC value is then compared to a MIC value included in the BIP frame to validate the BIP frame. Similarly, if a WUR frame is received by a LP-WUR of the executing device, then the WUR frame is validated based on the WUR IGTK. For example, a MIC for the WUR frame is generated based on the WUR IGTK, and compared to a MIC value included in the WUR frame itself.

Figure 19:
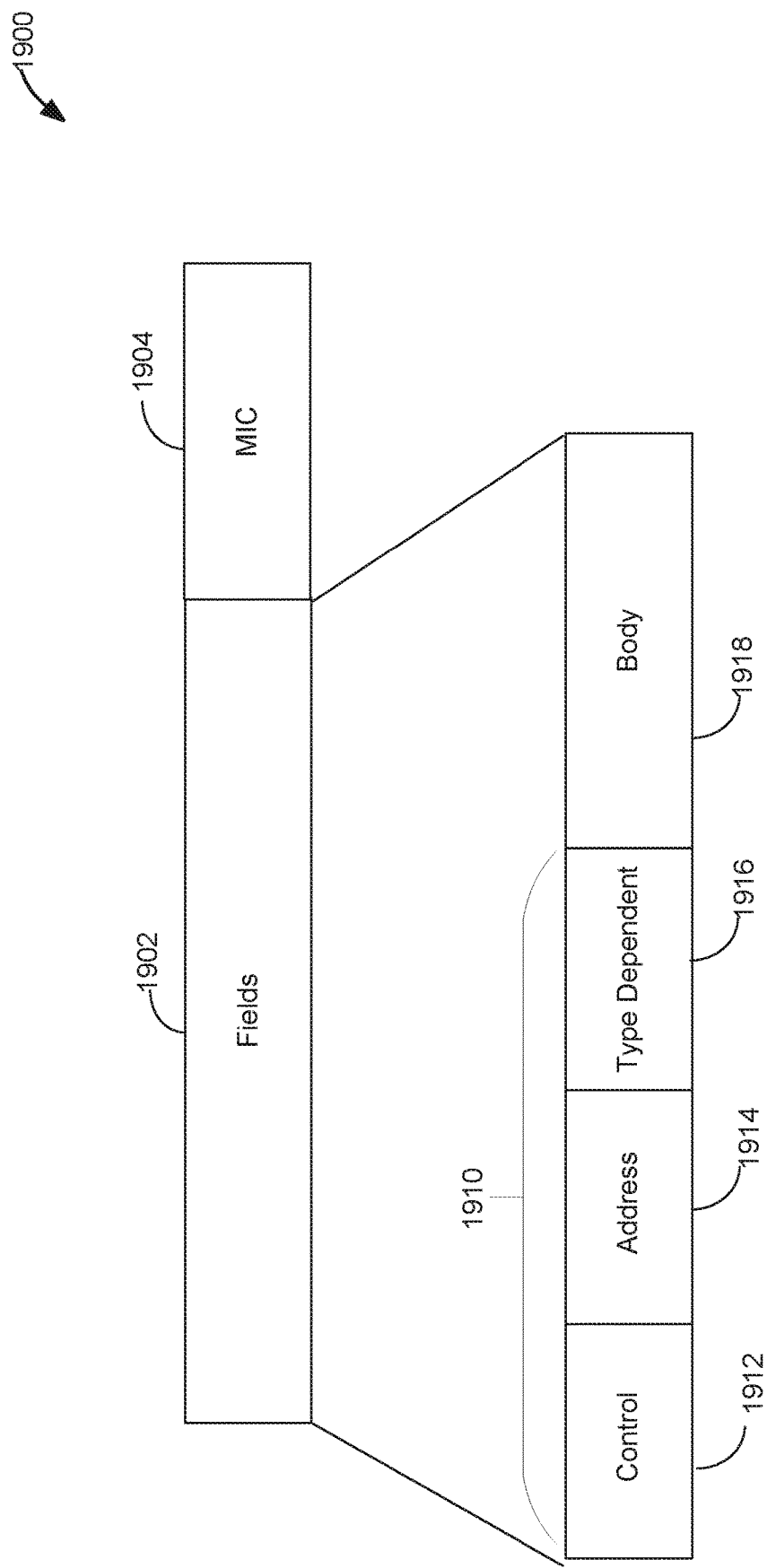
FIG. 19 depicts an example WUR frame 1900 according to at least some embodiments of the present disclosure.

FIG. 19 depicts an example WUR frame 1900 according to at least some embodiments of the present disclosure. As depicted, the WUR frame 1900 includes wake-up frame fields 1902 and a message integrity code (MIC) field 1904. The value of the MIC field 1904 can be set based on a computation known to both a device transmitting the WUR frame 1900 and another device receiving the WUR frame 1900. In some embodiments, the receiving device, such as a device including the WURx 806, can validate the authenticity of the WUR frame 1900 based on the value of the MIC field 1904. The WUR frame fields 1902 can include a header 1910 and optionally a body 1918. The header 1910 may include a control field 1912, an address field 1914 and a type dependent field 1916. The control field 1912 may include an indication (e.g., one or more bits) to indicate a type of the frame 1900 (e.g., wake-up frame, WUR beacon, or the like). The address field 1914 may include an address of a destination device for the WUR frame 1900, and the type dependent field 1916 contains information dependent on the type of the frame indicated within the control field 1912.

Figure 20:
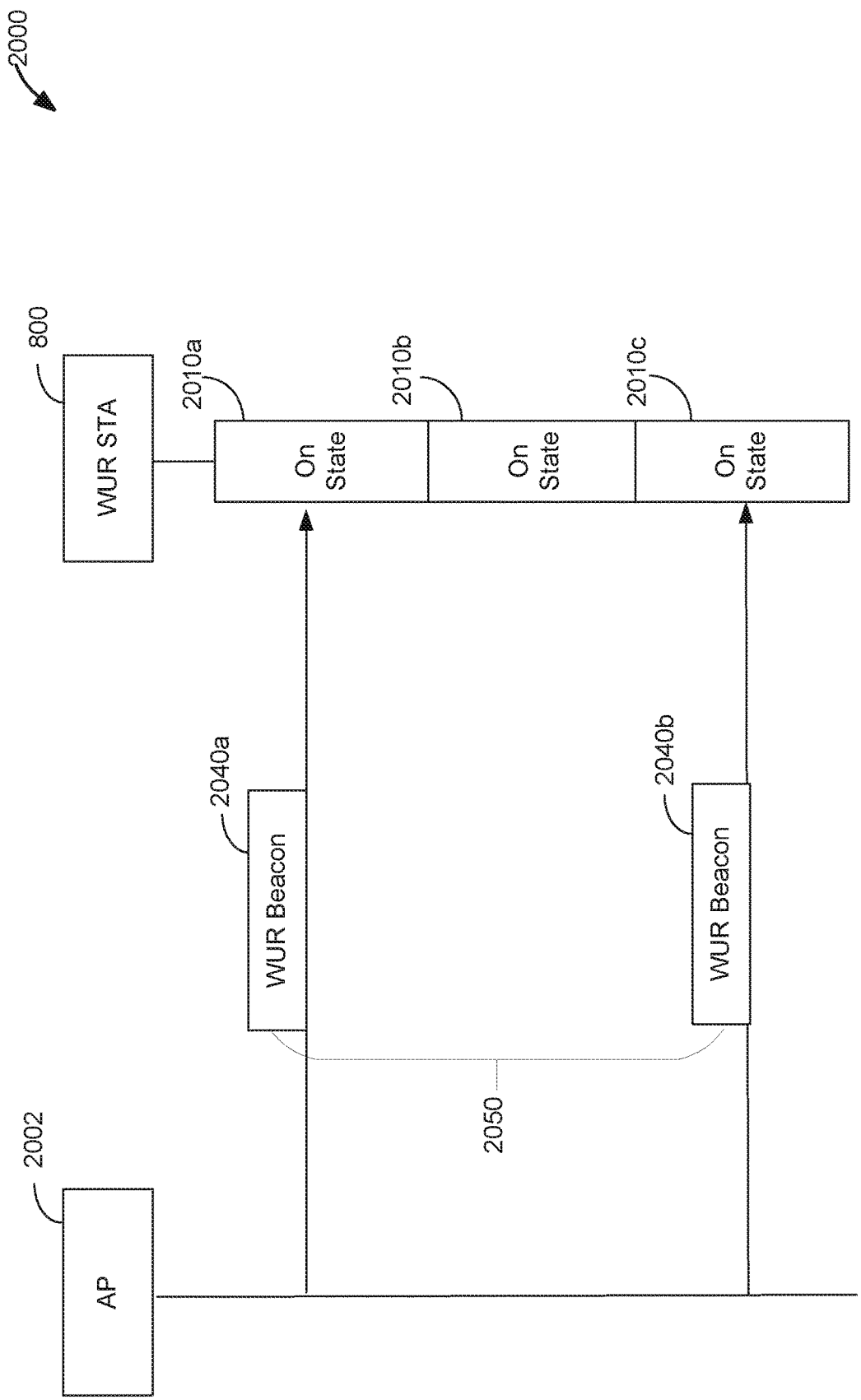
FIG. 20 illustrates a WUR station receiving WUR beacons.

FIG. 20 illustrates a WUR station receiving WUR beacons. In some implementations, a receiving device (e.g. 800) can duty cycle the WURx 806. This duty cycling of the WURx 806 is illustrated via sequential states 2010a, 2010b, and 2010c. Accordingly, a technique or scheme to synchronize timing between a transmitting device (e.g. AP 2002) and a receiving device (e.g., STA 800) such that the transmitting device transmits when the WURx 806 is on. In general, the synchronization between the devices can be facilitated via a WUR beacon transmitted by the AP 2002, which includes an indication of a portion of the time synchronization function (TSF) from a radio of the AP 2002. It is to be appreciated, that the TSF can be a 64 bit indication of a timing synchronization for standard Wi-Fi communication between the devices 2002 and 800.

As can be seen FIG. 20, the receiving device 800 can duty cycle the WURx 806 by periodically switching the radio between an on state 2010b and an off state 2010a or 2010c. Furthermore, the transmitting device (e.g. AP 2002) can send a WUR beacon 2040a-b to the device 800 during periods where the WURx 806 is in the "on" state. This period over which the device 2002 sends the WUR beacon 2040 is referred to as the WUR beacon interval 2050. In some examples, an indication of the partial TSF can be encoded (e.g., by the AP 2002, or the like) in the type dependent field 1916. As noted, the present disclosure provides for authentication of the WUR beacon 2040a or WUR beacon 2040b by inclusion of a MIC field (e.g., MIC field 1904, or the like).

Figure 21:
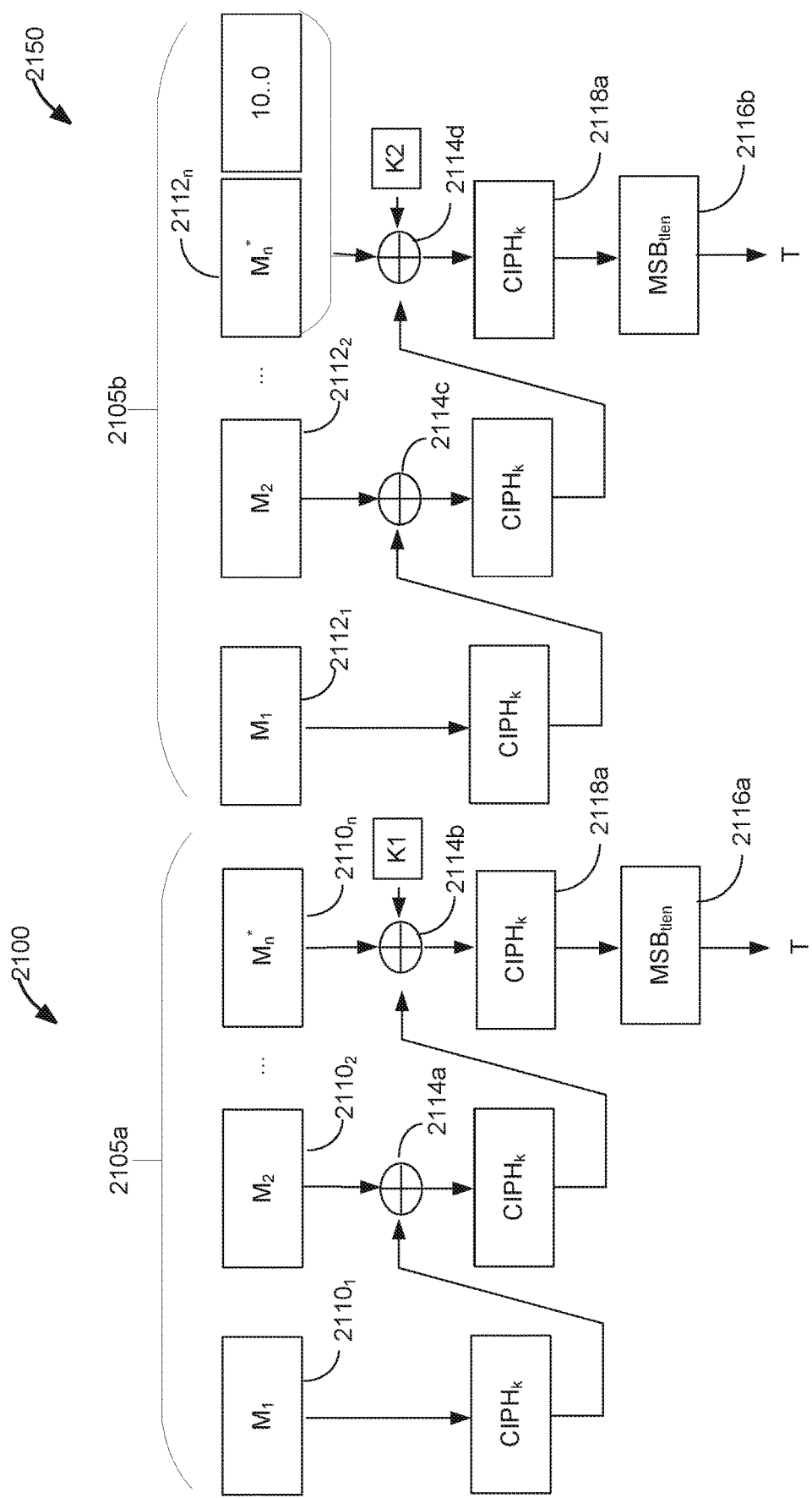
FIG. 21 depicts an example derivation 2100 of a value for a message integrity code (MIC) field according to some disclosed embodiments.

FIG. 21 depicts an example derivation 2100 of a value for a MIC field (e.g. 1904) according to some disclosed embodiments. The MIC calculation 2100 uses a cypher based message authentication code (CMAC) algorithm with an advanced encryption standard (AES) block cipher. The CMAC algorithm depicted in FIG. 21 is described in greater detail in the National Institute of Standards and Technology (NIST) Special Publication 800-38B, which is incorporated herein by reference in its entirety.

As depicted in FIG. 21; first, a first message 2105a is constructed from a received frame and dissected into several equally sized blocks $2110_{1...n}$, of size b, and denoted as Mi. Message 2105a is shown dividing evenly into n blocks with no remaining bits. Thus, subkey K1 is used to generate a value of size tlen for message 2105. Size tlen represents a size of a cypher code generated by the process described by FIG. 21. For example, a cypher code generated by the process of FIG. 21 may be used as a message integrity code in some of the disclosed embodiments (e.g. field 1904). Tlen in this example represents the size in bits or bytes of the message integrity code.

A second message 2105b is divided into blocks $2112_{1...n}$. Unlike the first message 2105a, the second message 2105b does not divide evenly into a number of blocks of size b, and thus, remaining bits are left over, in block Mn*. Thus, the computation of a MIC for message 2105b uses subkey K2.

The blocks $2110_{1...n}$ and/or $2112_{1...n}$ then go through a computation as depicted in FIG. 21; where CIPHK is the AES block cipher operation with either K1 or K2 and XOR operations 2114a-d. To generate results 2116a-b, the computation results 2118a-b are truncated to size tlen by taking the tlen most significant bit (MSB) bits. In various embodiments, the block size b can be either 128 bits or 256 bits.

In some examples, tlen indicates a size of a MIC. Larger values of tlen can provide greater assurance against guessing attacks. However, a performance tradeoff may exist in that larger values of tlen may require more bandwidth/storage for a MAC packet including a MIC of size tlen. For most applications, a value for tlen that is at least 64 bits may provide sufficient protection against guessing attacks. A value of tlen that is less than 64 may be used, for example, in conjunction with a careful analysis of the risks of accepting an inauthentic message as authentic. If the risks are small and/or consequences irrelevant, it may be more efficient to choose a value of tlen less than 64. When the tlen value is less than 64, a suggested formula for choosing tlen is shown below:

$$tlen \leq \log_2(maxinvalids/Risk),$$

where:
maxinvalids is a maximum acceptable number of times an invalid message may be received before one is accepted,
risk: the probability that a STA (e.g., receiving device 800) can tolerate being falsely woken up by an attacker.

One risk value that may be considered is Risk=$2^{-10}$=0.1%. This assumption for risk is based on an observation that the penalty for false wake-up may be limited to higher consumption of power and relay rather than more substantial disadvantages such as data breach or password loss. In these other environments, a lower risk value may be more appropriate, such as risk=$2^{20}$=0.0001%.

If an attacker can transmit one wake-up frame every 1.1 ms, for a period of Y seconds, then the attacker can send a maximum of Y*1000/1.1 attempts. Substituting this number into the above formula, we have around tlen 2: log 2(Y)+20. The value of Y may be considered a period for a device transmitting the WUR frame (e.g. AP) and a device receiving the WUR frame (e.g. non-AP STA, e.g. 800) to refresh a calculation of a MIC, for example by updating a subkey for the calculation. Updating the subkey requires additional overhead and a wake-up of the non-AP STA. Thus, a larger value of Y results in reduced overhead relative to a smaller value of Y.

To withstand a brute force attack of approximately 40 hours=144,000 seconds, then a tlen of thirty seven (37) bits may be necessary. A tlen of this length results in a relatively large amount of overhead in terms of packet size. Generally, with a higher value of Y, a low overhead on the main radio is provided for updating parameter. There is a relatively high overhead on the resulting MIC size. With a relatively smaller value of Y, there is a relatively higher amount of overhead on the main radio (PCR) with respect to parameter updates, but generally lower overhead with respect to a size of the MIC.

The present embodiments propose to include a partial TSF value as part of the WUR frame. Since the partial TSF will change across time, a MIC value for a wake-up packet will also change, because of course the included TSF value is also changing, and the MIC is based on contents of the message itself. To ensure a receiving device has an equivalent partial TSF value as a transmitting device, a WUR packet requiring authentication will include a portion of the TSF that is unlikely to change during the generation and transmission of the WUR frame at the transmitting device until reception and decoding/processing by the receiving device. For example, the portion included in the WUR frame may not include, in various embodiments, the lowest order five, four, three, two, or one bits.

With respect to the above discussion, inclusion of a partial TSF in the WUR frame, essentially limits a value of Y without needs to exchange messages with a main radio (e.g. primary connectivity radio (PCR) to update parameters such as a subkey.

In some of these embodiments, a second portion of the transmitting device's TSF is also included in the MIC calculation, but is not included in the WUR frame itself. Before including the value of this second TSF portion in the MIC calculation, a function "f" may be applied to the partial TSF to change its value before providing that value to the MIC calculation. For example, the function "f" may apply an exclusive or operation or a truncation operation to the second portion of the TSF. The portion of the TSF not included in the WUR frame may be a higher order portion than the other portion of the TSF that is included in the WUR frame.

Figure 22:
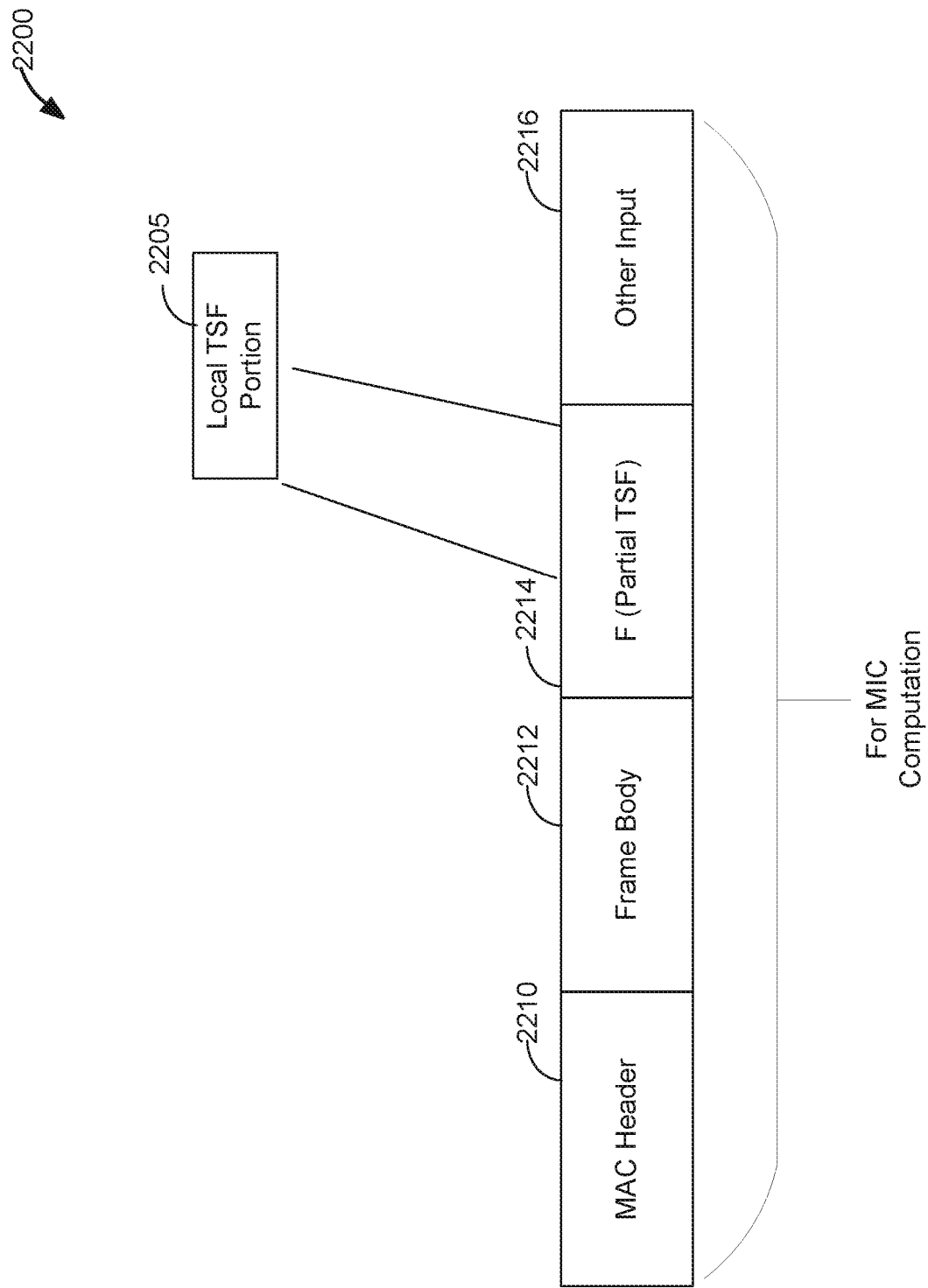
FIG. 22 shows data that may be used to determine a value of message integrity code in one or more of the disclosed embodiments.

FIG. 22 depicts a block diagram 2200 showing data included in a MIC computation at both a transmitting and receiving device. As depicted in FIG. 22, data used to compute the MIC includes a mac header 2210, frame body 2212, partial TSF 2214, and other fields 2216. A portion of a TSF 2205 may be included in the MIC calculation after being modified by a function f.

The function f may make it more difficult to attack a low power wake-up radio. For example, without use of the function f, an attacker could synchronize its own TSF with the main radio beacon, and then attack another WUR device based on its TSF value. To avoid this, in some examples, the function f can be indicated by a device transmitting a WUR frame. For example, different devices associated with a single AP may be assigned different f functions by an access point, such that the function f is private between a particular AP/STA pair. In some examples, the function f can be predefined or hard coded. In some examples, the function f can change based on a value of the partial TSF (e.g., function f1 when partial TSF is odd, function f2 when partial TSF is even). In some examples, the function f is configured to perform an XOR operation on the partial TSF with a bit pattern indicated by a device transmitting the WUR packet 1900. For example, the transmitter of the WUR packet 1900 can indicate the bit pattern to XOR with the partial TSF. The indication could be in the body 1918, in a WUR action field, or when the transmitting device and receiving device negotiate WU parameters.

Figure 23:
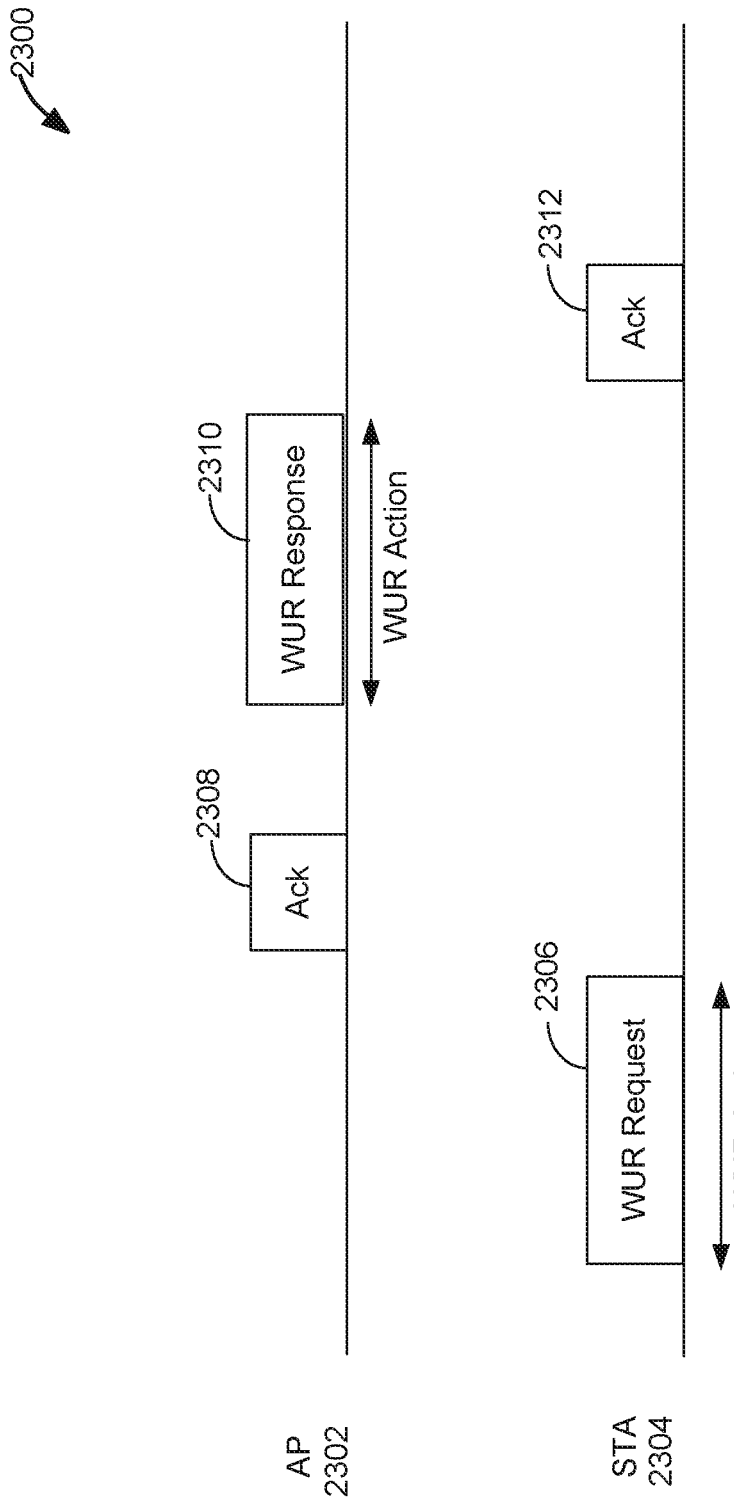
FIG. 23 is a message sequence diagram showing negotiation of wake-up radio parameters, including an indication of a location of a partial TSF in a WUR frame.

FIG. 23 is a message sequence diagram showing negotiation of wake-up radio parameters, including an indication of a location of a partial TSF in a WUR frame. FIG. 23 shows an access point 2302 and a station 2304. The station 2304 transmits a WUR request frame 2306, which is acknowledged by the AP 2302 with an acknowledgment frame 2308. In some examples, an indication of a location of a TSF in a WUR frame exchanged between the AP 2303 and STA 2304 may be indicated within the WUR request frame 2306. For example, the indication may be included in an information element carried in a WUR Action frame or carried in other management frames like a beacon frame. The element can be a WUR mode element. In some examples, the indication can provide the MSB of partial TSF (e.g., 63, or the like).

Figure 24:
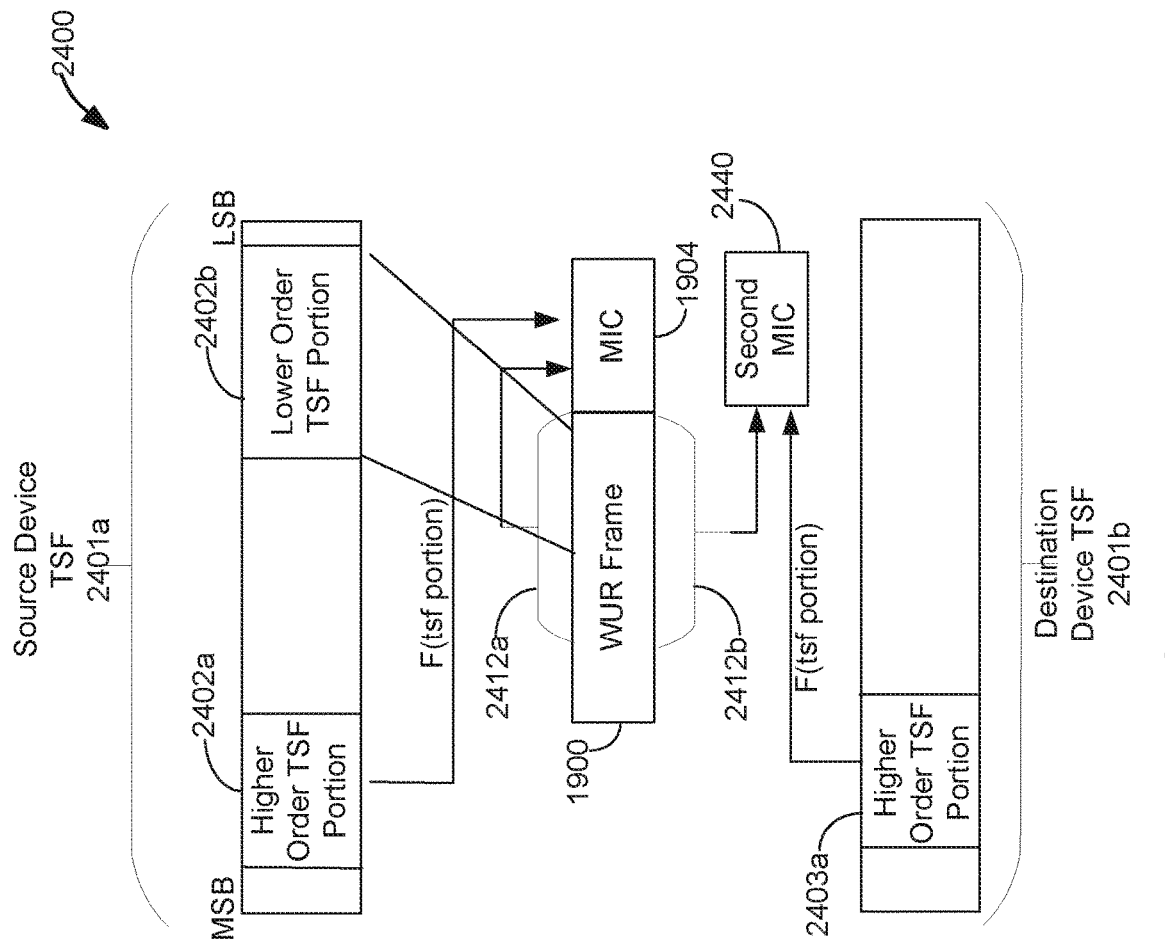
FIG. 24 illustrates how a message integrity code may be calculated by a transmitting device and a receiving device in one or more of the disclosed embodiments.

FIG. 24 illustrates how a message integrity code may be calculated by a transmitting device and a receiving device in one or more of the disclosed embodiments. FIG. 24 shows a TSF of a source device 2401a and a destination device 2401b. When generating the WUR frame 1900, the MIC 1904 may be generated based on a high order portion of the TSF 2401a, shown as 2402a. Note that TSF portion 2402a is not included in the WUR frame itself. A lower order portion of the TSF 2401a, labeled 2402b in FIG. 24, is included in the WUR frame 1900. While the discussion of FIG. 24 refers to WUR frame 1900, in some embodiments, the WUR frame of FIG. 24 could also comply with the format of WUR frame 900.

The MIC 1904 is calculated based on both TSF portions 2402a and 2402b, even though only a single portion, such as portion 2402b, is included in the WUF frame 1900. Note the MIC 1904 is calculated by the transmitting device based on at least a portion of the WUR frame itself, labeled as 2412a. In some aspects, the TSF portion 2402a may be modified by a function f before being used in the calculation of MIC 1904. In some aspects, f is an exclusive or function, or a truncation function.

When the WUR frame 1900 is received at the receiving device, an additional MIC value is calculated, shown as second MIC 2440. The second MIC 2440 is determined based on contents of the WUR frame 1900, shown as 2412b, which may be equivalent to 2412a, if there were no transmission errors of the WUR frame 1900 between the transmitting device and receiving device. The second MIC is also calculated based on a portion of a TSF local to the destination device, shown as 2403a. If the transmitting device and receiving device have properly synchronized TSF timers, the portion 2402a and 2403a should be identical, and the MIC code 2440 should match the MIC 1904.

In some aspects, where the partial TSF 2402b is located within the WUR frame may be determined based on an exchange of messages between the transmitting device and receiving device. For example, the AP and WUR STA may exchange one or more action frames to negotiate wake-up operation parameters, including the location of the TSF. In some aspects, this information may be included in an action field or an action WUR frame. The indication can be carried in an information element carried in a WUR action frame or carried in another type of management frame such as a beacon frame. In some aspects, the information element can be a WUR mode element. In some embodiments, as shown in FIG. 24, a TSF portion carried in the WUR frame (e.g. 2402b) is a lower order portion of the TSF than is not included in the WUR frame 1900 but still included in the MIC calculation (e.g. 2402a). Because the portion 2402b is lower order, it changes more rapidly than the higher order portion 2402. However, both the lower order portion 2402a and high order portion 2402b may change during communication between the transmitting and receiving device (e.g. rollover).

Alternatively, the location of a TSF portion within the WUR frame 1900 may be predefined or fixed.

In some other embodiments, the location of a partial TSF 2402b carried in the WUR frame 1900 can be indicated in the WUR frame itself.

The WUR frame 2420 may be a WUR beacon frame in some aspects, or another type of WUR frame. The WUR frame 2420 may require MIC verification. Thus, by including the partial TSF 2402b in the WUR frame 2420, verification of the MIC functions to confirm that both a transmitter of the WUR frame 2420, and a receiver of the WUR frame 2420 have the same TSF value 2405.

In some aspects, a LSB of a partial TSF 2402a included in message M 2410 is larger than a MSB of a partial TSF carried in the WUR Frame 2420. In some examples, the Partial TSF 2402b can be carried in a TD control field (not shown, e.g. 906) in the WUR frame 2420. The TD control field may include a MIC field. In some examples, the Partial TSF 2402b can be carried in a frame body field (e.g. 1918) of the WUR frame 2420.

As discussed above, in some aspects, devices exchanging a WUR frame, such as the WUR frame 2420, may negotiate a location of the partial TSF 2402b within the WUR frame 2420 via an exchange of WUR action frames.

Figure 25:
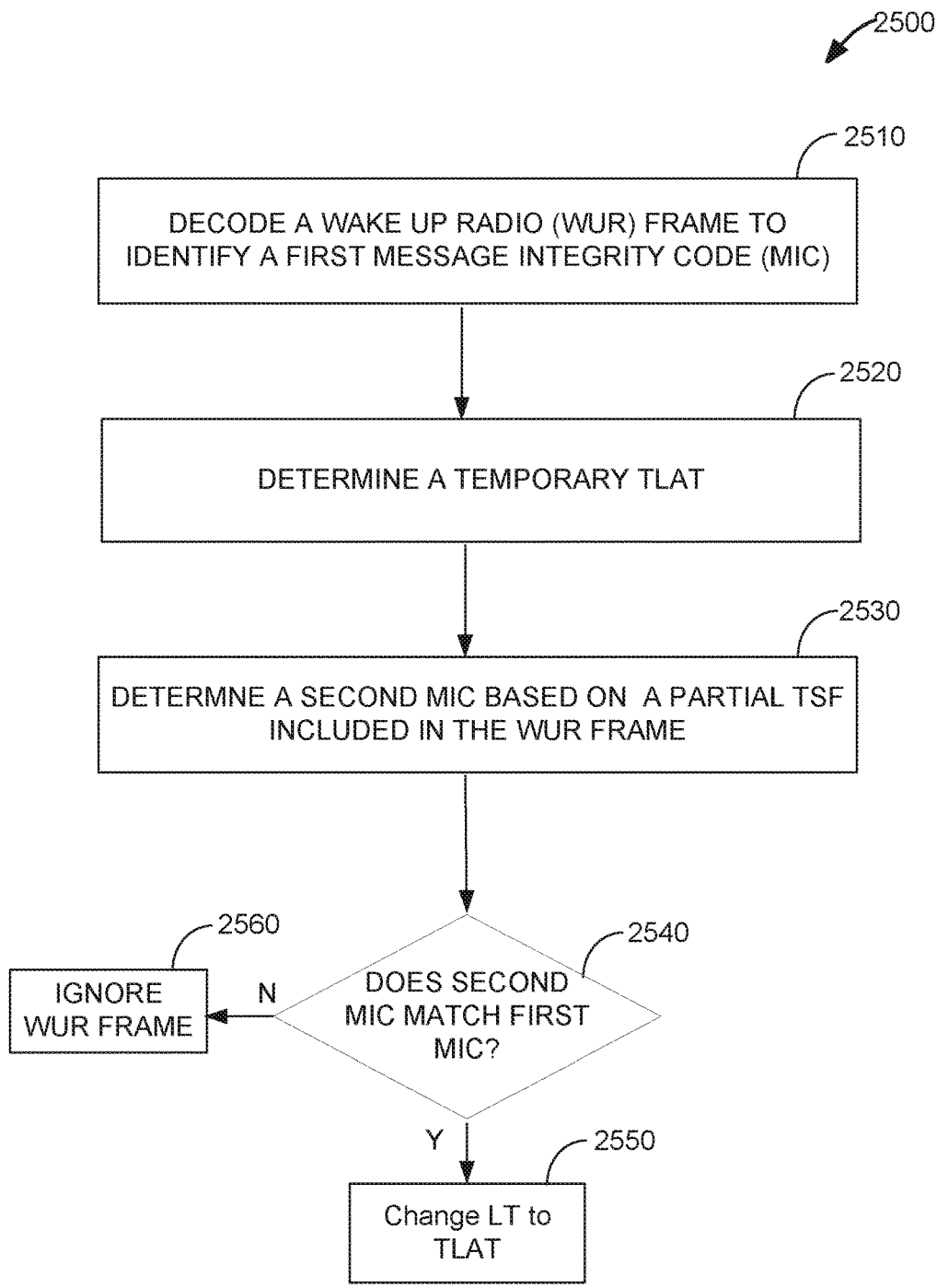
FIG. 25 is a flowchart of a process for receiving a WUR frame.

FIG. 25 is a flowchart of a process for receiving a WUR frame. In some aspects, one or more of the functions of process 2500 discussed below with respect to FIG. 25 may be performed by hardware processing circuitry. For example, instructions stored in an electronic hardware memory may configure the hardware processing circuitry to perform one or more of the functions discussed below with respect to FIG. 25 and process 2500.

In operation 2510, a wake-up radio (WUR) frame is received that includes a message integrity code. For example, device 800, and specifically WURx 806 may receive a wake-up radio packet, such as a WUR frame 1900, which includes the MIC field 1906.

In operation 2520, a temporary local adjusted timer (TLAT) is determined. In some aspects, a WURx (e.g. 806) may determine the TLAT. In some other embodiments, processing circuitry 802 may determine the TLAT. Determination of the TLAT combines a portion of a local TSF timer with a second TSF portion included in the received WUR frame. For example, as discussed above with respect to FIG. 24, the TLAT may include the TSF portion 2403a of the receiving device and a portion of a TSF included in the WUR frame 1900, which derives, in FIG. 24, from the portion 2402b of the transmitting device's TSF 2401a. The TLAT may be an equivalent size of a TSF on the receiving device, thus, in some aspects, the TLAT may include more bits from the TSF 2401b then just the portion 2403a. For example, the TLAT may include all bits of the TSF 2401b that do not overlap with bits included in the portion 2402b, which is obtained from a received WUR frame (e.g. 1900).

In some aspects, the least significant bit (LSB) of the TLAT may be set to the LSB of the partial TSF included in the wake-up radio frame received in operation 2510 (e.g. derived from 2402b). In some aspects, the LSB of the TLAT may be set to a LSB of a partial TSF decoded from a WUR beacon frame. In some examples, TLAT has MSB location equal to 63.

In some embodiments, if the WUR frame received in operation 2510 includes a partial TSF, the adjustment of the TLAT can be based on the partial TSF in the WUR frame. A WURx (e.g. 806) may perform additional partial TSF verification of the WUR frame.

In some aspects, the WUR receiver records a comparison partial TSF value. For example, the comparison partial TSF value has LSB location equal to the LSB location of the partial TSF carried in the WUR frame. The MSB location of comparison partial TSF value is 63. The comparison partial TSF value is updated based on TLAT after receiving a WUR frame with valid MIC. The comparison partial TSF value can be initialized when STA enter WUR mode to have WUR operation. More specifically, the initialization can be based on the TSF value when entering the WUR mode; and/or the initialization value can be a fixed threshold indicated by the WUR transmitter or defined in the specification or standard to which the device is implemented.

In some embodiments, after receiving a WUR frame, if TLAT<comparison partial TSF+threshold, where the comparison considers modular wrapping around operation, then passes. Otherwise, fails. In some examples, the threshold can be $2^{(size\ of\ comparison\ partial\ TSF-1)}$.

In operation 2530, a second MIC is determined based on location of the partial TSF. For example, WURx 806, or processing circuitry 802 can take the corresponding location of partial TSF as input to message M construction, of TLAT and plugs in local construction of message M to do MIC calculation. As discussed above with respect to FIG. 24, the second MIC 2440 may be generated based on a portion of the WUR frame 2412b and a portion of the local TSF 2401b, notated as 2403b in FIG. 24. In some aspects, a function may be applied to the high order portion of the TSF before calculating the second MIC. The function may be an exclusive or operation with a constant value, or a truncation.

In decision operation 2540, the determined second MIC is compared to the MIC received in the WUR frame in operation 2510. If the two MIC values are not equivalent, the WUR frame received in operation 2510 is ignored. If the MIC values match, then process 2500 moves to operation 2550.

In operation 2550, since the MICs are equivalent, the validity of the WUR frame received in operation 2510 has been confirmed. Thus, a local timer (LT) (e.g. 2401b) running on the receiving device (e.g. 800) may be changed to the temporary local adjusted time (TLAT). In some embodiments, operation 2550 may include additional verifications prior to changing the local time based on the received WUR frame. For example, in some embodiments, a sequence number may included in the WUR frame. The receiving device (e.g. 800) may verify that the sequence number has incremented relative to a previously validated wake-up frame.

As an example implementation, a partial TSF included in a wake-up radio beacon is stored at location [19:8] of the TSF in PCR. In this example, the partial TSF included in the message received in operation 2510 is stored in location [63:20] of the TSF in PCR. In this example, the partial TSF in the received message will change every $2^{20}$ µsec, which is approximately one (1) second. Considering: tlen≥log 2(y)+20, where y=1, this indicates that 20 bits may be used to provide matching criterion. This demonstrates that a relatively small MIC size may provide a robust authentication protocol while maintaining efficient and low overhead.

Figure 26:
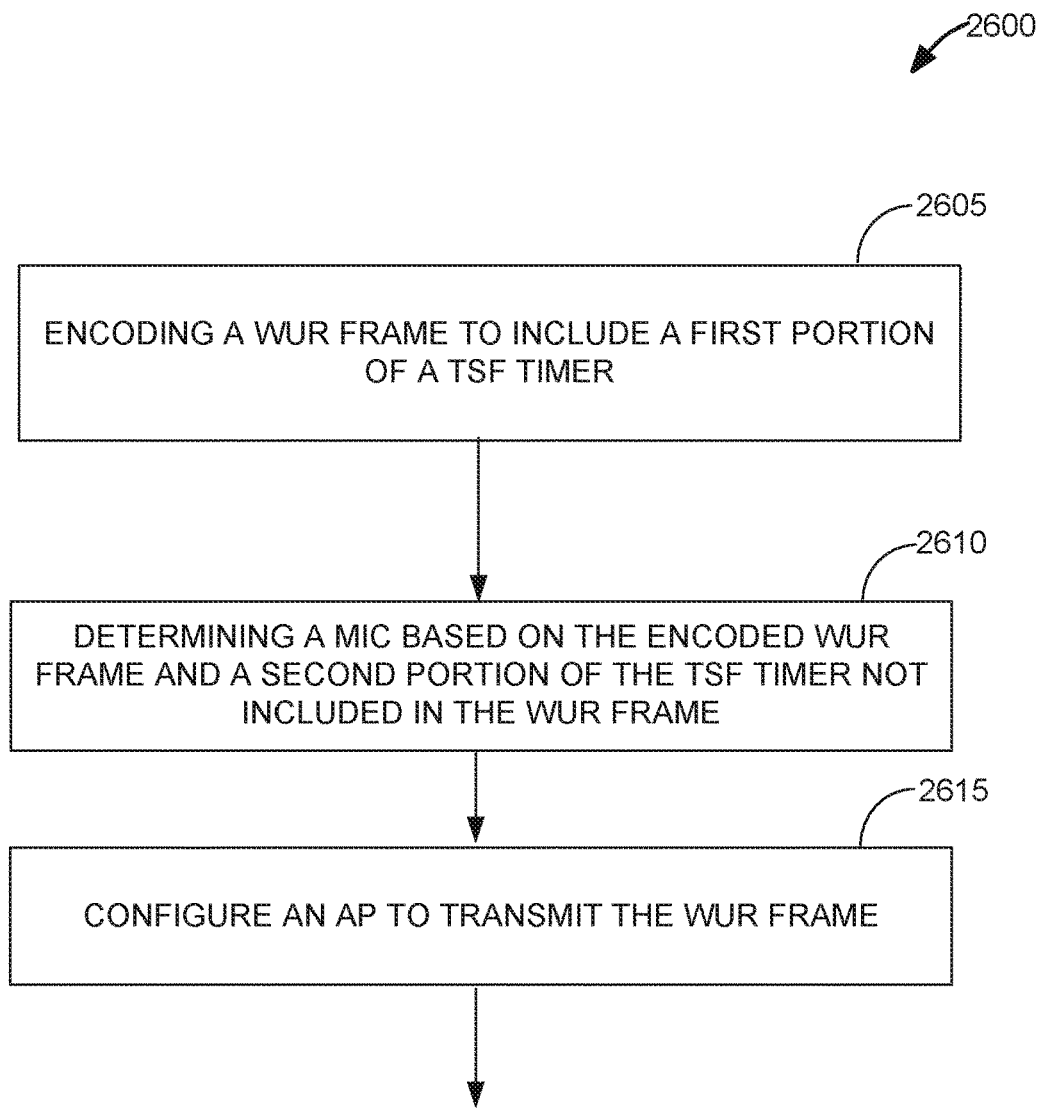
FIG. 26 is a flowchart of a process for encoding a WUR frame.

FIG. 26 is a flowchart of a process for encoding a WUR frame. In some aspects, one or more of the functions of process 2600 discussed below with respect to FIG. 26 may be performed by hardware processing circuitry. For example, instructions stored in an electronic hardware memory may configure the hardware processing circuitry to perform one or more of the functions discussed below with respect to FIG. 26 and process 2600. In some aspects, process 2600 may be performed by a non-AP STA.

In operation 2605, a WUR frame is encoded to include a first portion of a TSF timer. For example, as discussed above, a device transmitting a WUR frame may include a portion, such as portion 2402b of FIG. 14, in a WUR frame 1900. The TSF timer may be periodically, or at other times, synchronized with TSF timers of one or more associated stations. In some aspects, the WUR frame is encoded to indicate a location of the first portion of the TSF timer. For example, a WUR frame may be encoded to include a field indicating an offset from the beginning of the WUR frame or a beginning of a data portion of the WUR frame until the first portion of the TSF.

In operation 2510, a message integrity code is determined based on the encoded WUR frame and a second portion of the TSF timer, which is not included in the WUR frame. For example, as discussed above with respect to FIG. 24, a device transmitting a WUR frame may include a portion of its own local TSF timer (e.g., 2402b) in a calculation of a MIC for a WUR frame. In some aspects, the second portion of the TSF timer is a higher order portion of the TSF timer than the first portion. In some aspects, the two portions do not overlap.

In operation 2615, an access point is configured to transmit the WUR frame. Configuring a device to transmit a WUR frame may include, for example, the application processor 111 notifying the baseband circuitry 108 that the WUR frame is ready for transmission, or the control logic 406 notifying baseband transmitter 404 that the WUR frame is ready for transmission.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is an apparatus of a wake-up radio (WUR) non-access point (non-AP) station (STA), the apparatus comprising: a memory; first processing circuitry coupled to the memory, the first processing circuity configured to: decode a first message from an access point to identify a first integrity group temporal key (IGTK); decode a second message from the access point to identify a WUR IGTK; and configure the non-AP STA to communicate with the access point, via a primary connectivity radio (PCR), using the first IGTK; and second processing circuitry configured to: decode a WUR frame from the access point received by a low-power wake-up receiver (WURx), to identify a first message integrity code (MIC); determine a second MIC based on the WUR frame and the WUR IGTK; authenticate the WUR frame based in response to the first MIC and the second MIC being equivalent; and generate signalling for the first processing circuitry in response to the authentication of the WUR frame.

In Example 2, the subject matter of Example 1 optionally includes wherein the first processing circuitry is further configured to: transition the PCR from an awake state to a doze state; if the WUR frame is a WUR Wake-Up frame, cause the PCR to exit the doze state to return to the awake state in response to a wake-up signal received from the second processing circuitry; configure the WUR non-STA AP to communicate with the access point via the first IGTK when in the awake state, and wherein the second processing circuitry is configured to decode signals received from the access point via the WUR IGTK when the PCR is in the doze state.

In Example 3, the subject matter of any one or more of Examples 1-2 optionally include wherein the second processing circuitry is further configured to decode a frame control field of the WUR frame to determine a first WUR key identifier, and identify the WUR IGTK based on the first WUR key identifier.

In Example 4, the subject matter of Example 3 optionally includes wherein the first processing circuitry is further configured to decode the second message from the access point to determine the first WUR key identifier, and store an association between the WUR IGTK and the first WUR key identifier in the memory, the association being based on the second message from the access point.

In Example 5, the subject matter of Example 4 optionally includes wherein the first processing circuitry is further configured to decode a third message from the access point to identify a second WUR IGTK and a second WUR key identifier, and the second processing circuitry is further configured to decode a key identifier from a second WUR frame; select either the first WUR IGTK or the second WUR IGTK for decoding the second WUR frame based on whether the key identifier decoded from the second WUR frame is equivalent to the first WUR key identifier or the second WUR key identifier.

In Example 6, the subject matter of Example 5 optionally includes wherein the first processing circuitry is further configured to decode a key identifier for the first IGTK from the first message, decode a fourth message from the access point to identify a second IGTK and a key identifier of the second IGTK, decode an additional key identifier from a fifth message, select either the first IGTK or the second IGTK for decoding of the fifth message based on whether the additional key identifier decoded from the fifth message is equivalent to the key identifier for the first IGTK or the key identifier for the second IGTK.

In Example 7, the subject matter of Example 6 optionally includes wherein the first processing circuitry is configured to maintain a second association between the first IGTK and the key identifier for the first IGTK, and a third association between the second IGTK and the key identifier for the second IGTK, and to select the first IGTK or the second IGTK for decoding of the fifth message based on the second and third associations.

In Example 8, the subject matter of Example 7 optionally includes wherein the WUR key identifiers do not overlap with the key identifier of the first IGTK and do not overlap with the key identifier for the second IGTK.

In Example 9, the subject matter of any one or more of Examples 1-8 optionally include wherein if the WUR frame is a WUR beacon frame, authenticate the WUR beacon frame based on the WUR IGTK, and process the WUR beacon frame based on the authentication.

In Example 10, the subject matter of any one or more of Examples 1-9 optionally include wherein the first processing circuitry is further configured to decode a multicast/broadcast integrity protocol (BIP) message, received by the PCR, and authenticate the BIP message based on the first IGTK.

In Example 11, the subject matter of any one or more of Examples 1-10 optionally include wherein the first processing circuitry is further configured to perform a four way handshake as a supplicant device with the AP as an authenticator device, wherein performing the four way handshake comprises generating an snonce, receiving an anonce from the authenticator device, and receiving the WUR IGTK from the authenticator device.

In Example 12, the subject matter of any one or more of Examples 1-11 optionally include transceiver circuitry coupled to the processing circuitry, the transceiver circuitry configured to be coupled to one or more antennas.

In Example 13, the subject matter of any one or more of Examples 1-12 optionally include a local timer synchronization function (TSF) timer, wherein the second processing circuitry is further configured to determine the second MIC based on the local timer synchronization function (TSF) timer.

Example 14 is a method for a wake-up radio (WUR) non-access point (non-AP) station (STA), comprising: decoding a first message from an access point to identify a first integrity group temporal key (IGTK); decoding a second message from the access point to identify a WUR IGTK; and configuring the non-AP STA to communicate with the access point, via a primary connectivity radio (PCR), using the first IGTK; and decoding a WUR frame from the access point received by a low-power wake-up receiver (WURx), to identify a first message integrity code (MIC); determining a second MIC based on the WUR frame and the WUR IGTK; authenticating the WUR frame based in response to the first MIC and the second MIC being equivalent, and generating signalling for the WURx in response to the authentication of the WUR frame.

In Example 15, the subject matter of Example 14 optionally includes transitioning the PCR from an awake state to a doze state; if the WUR frame is a WUR Wake-Up frame, causing the PCR to exit the doze state to return to the awake state in response to a wake-up signal received from the WURx; configuring the WUR non-STA AP to communicate with the access point via the first IGTK when in the awake state; and decoding signals received from the access point via the WUR IGTK when the PCR is in the doze state.

In Example 16, the subject matter of any one or more of Examples 14-15 optionally include decoding a frame control field of the WUR frame to determine a first WUR key identifier; and identifying the WUR IGTK based on the first WUR key identifier.

In Example 17, the subject matter of Example 16 optionally includes decoding the second message from the access point to determine the first WUR key identifier, and storing an association between the WUR IGTK and the first WUR key identifier in the memory, the association being based on the second message from the access point.

In Example 18, the subject matter of Example 17 optionally includes decoding a third message from the access point to identify a second WUR IGTK and a second WUR key identifier; decoding a key identifier from a second WUR frame; and selecting either the first WUR IGTK or the second WUR IGTK for decoding the second WUR frame based on whether the key identifier decoded from the second WUR frame is equivalent to the first WUR key identifier or the second WUR key identifier.

In Example 19, the subject matter of Example 18 optionally includes decoding a key identifier for the first IGTK from the first message; decoding a fourth message from the access point to identify a second IGTK and a key identifier of the second IGTK; decoding an additional key identifier from a fifth message, selecting either the first IGTK or the second IGTK for decoding of the fifth message based on whether the additional key identifier decoded from the fifth message is equivalent to the key identifier for the first IGTK or the key identifier for the second IGTK.

In Example 20, the subject matter of Example 19 optionally includes maintaining a second association between the first IGTK and the key identifier for the first IGTK, and a third association between the second IGTK and the key identifier for the second IGTK, and selecting the first IGTK or the second IGTK for decoding of the fifth message based on the second and third associations.

In Example 21, the subject matter of Example 20 optionally includes wherein the WUR key identifiers do not overlap with the key identifier of the first IGTK and do not overlap with the key identifier for the second IGTK.

In Example 22, the subject matter of any one or more of Examples 14-21 optionally include wherein if the WUR frame is a WUR beacon frame, authenticate the WUR beacon frame based on the WUR IGTK, and process the WUR beacon frame based on the authentication.

In Example 23, the subject matter of any one or more of Examples 14-22 optionally include decoding a multicast/broadcast integrity protocol (BIP) message, received by the PCR, and authenticate the BIP message based on the first IGTK.

In Example 24, the subject matter of any one or more of Examples 14-23 optionally include performing a four way handshake as a supplicant device with the AP as an authenticator device, wherein performing the four way handshake comprises generating an snonce, receiving an anonce from the authenticator device, and receiving the WUR IGTK from the authenticator device.

In Example 25, the subject matter of any one or more of Examples 14-24 optionally include determining the second MIC based on a local timer synchronization function (TSF) timer.

Example 26 is a non-transitory computer readable medium comprising instructions that when executed configure hardware processing circuitry to perform operations for a wake-up radio (WUR) non-access point (non-AP) station (STA), the operations comprising: decoding a first message from an access point to identify a first integrity group temporal key (IGTK); decoding a second message from the access point to identify a WUR IGTK; and configuring the non-AP STA to communicate with the access point, via a primary connectivity radio (PCR), using the first IGTK; and decoding a WUR frame from the access point received by a low-power wake-up receiver (WURx), to identify a first message integrity code (MIC); determining a second MIC based on the WUR frame and the WUR IGTK; authenticating the WUR frame based in response to the first MIC and the second MIC being equivalent, and generating signalling for the WURx in response to the authentication of the WUR frame.

In Example 27, the subject matter of Example 26 optionally includes transitioning the PCR from an awake state to a doze state; if the WUR frame is a WUR Wake-Up frame, causing the PCR to exit the doze state to return to the awake state in response to a wake-up signal received from the WURx; configuring the WUR non-STA AP to communicate with the access point via the first IGTK when in the awake state; and decoding signals received from the access point via the WUR IGTK when the PCR is in the doze state.

In Example 28, the subject matter of any one or more of Examples 26-27 optionally include decoding a frame control field of the WUR frame to determine a first WUR key identifier; and identifying the WUR IGTK based on the first WUR key identifier.

In Example 29, the subject matter of any one or more of Examples 27-28 optionally include decoding the second message from the access point to determine the first WUR key identifier, and storing an association between the WUR IGTK and the first WUR key identifier in the memory, the association being based on the second message from the access point.

In Example 30, the subject matter of any one or more of Examples 28-29 optionally include decoding a third message from the access point to identify a second WUR IGTK and a second WUR key identifier; decoding a key identifier from a second WUR frame; and selecting either the first WUR IGTK or the second WUR IGTK for decoding the second WUR frame based on whether the key identifier decoded from the second WUR frame is equivalent to the first WUR key identifier or the second WUR key identifier.

In Example 31, the subject matter of Example 30 optionally includes decoding a key identifier for the first IGTK from the first message; decoding a fourth message from the access point to identify a second IGTK and a key identifier of the second IGTK; decoding an additional key identifier from a fifth message, selecting either the first IGTK or the second IGTK for decoding of the fifth message based on whether the additional key identifier decoded from the fifth message is equivalent to the key identifier for the first IGTK or the key identifier for the second IGTK.

In Example 32, the subject matter of Example 31 optionally includes maintaining a second association between the first IGTK and the key identifier for the first IGTK, and a third association between the second IGTK and the key identifier for the second IGTK, and selecting the first IGTK or the second IGTK for decoding of the fifth message based on the second and third associations.

In Example 33, the subject matter of Example 32 optionally includes wherein the WUR key identifiers do not overlap with the key identifier of the first IGTK and do not overlap with the key identifier for the second IGTK.

In Example 34, the subject matter of any one or more of Examples 26-33 optionally include wherein if the WUR frame is a WUR beacon frame, authenticate the WUR beacon frame based on the WUR IGTK, and process the WUR beacon frame based on the authentication.

In Example 35, the subject matter of any one or more of Examples 26-34 optionally include decoding a multicast/broadcast integrity protocol (BIP) message, received by the PCR, and authenticate the BIP message based on the first IGTK.

In Example 36, the subject matter of any one or more of Examples 26-35 optionally include performing a four way handshake as a supplicant device with the AP as an authenticator device, wherein performing the four way handshake comprises generating an snonce, receiving an anonce from the authenticator device, and receiving the WUR IGTK from the authenticator device.

In Example 37, the subject matter of any one or more of Examples 26-36 optionally include determining the second MIC based on a local timer synchronization function (TSF) timer.

Example 38 is an apparatus of a wake-up radio (WUR) non-access point (non-AP) station (STA), comprising: means for decoding a first message from an access point to identify a first integrity group temporal key (IGTK); means for decoding a second message from the access point to identify a WUR IGTK; and means for configuring the non-AP STA to communicate with the access point, via a primary connectivity radio (PCR), using the first IGTK; and means for decoding a WUR frame from the access point received by a low-power wake-up receiver (WURx), to identify a first message integrity code (MIC); means for determining a second MIC based on the WUR frame and the WUR IGTK; means for authenticating the WUR frame based in response to the first MIC and the second MIC being equivalent, and means for generating signalling for the WURx in response to the authentication of the WUR frame.

In Example 39, the subject matter of Example 38 optionally includes means for transitioning the PCR from an awake state to a doze state; means for causing the PCR to exit the doze state to return to the awake state in response to a wake-up signal received from the WURx; means for configuring the WUR non-STA AP to communicate with the access point via the first IGTK when in the awake state; and means for decoding signals received from the access point via the WUR IGTK when the PCR is in the doze state.

In Example 40, the subject matter of any one or more of Examples 38-39 optionally include means for decoding a frame control field of the WUR frame to determine a first WUR key identifier; and means for identifying the WUR IGTK based on the first WUR key identifier.

In Example 41, the subject matter of Example 40 optionally includes means for decoding the second message from the access point to determine the first WUR key identifier; and means for storing an association between the WUR IGTK and the first WUR key identifier in the memory, the association being based on the second message from the access point.

In Example 42, the subject matter of Example 41 optionally includes means for decoding a third message from the access point to identify a second WUR IGTK and a second WUR key identifier; means for decoding a key identifier from a second WUR frame; and means for selecting either the first WUR IGTK or the second WUR IGTK for decoding the second WUR frame based on whether the key identifier decoded from the second WUR frame is equivalent to the first WUR key identifier or the second WUR key identifier.

In Example 43, the subject matter of Example 42 optionally includes means for decoding a key identifier for the first IGTK from the first message; means for decoding a fourth message from the access point to identify a second IGTK and a key identifier of the second IGTK; means for decoding an additional key identifier from a fifth message; and means for selecting either the first IGTK or the second IGTK for decoding of the fifth message based on whether the additional key identifier decoded from the fifth message is equivalent to the key identifier for the first IGTK or the key identifier for the second IGTK.

In Example 44, the subject matter of Example 43 optionally includes means for maintaining a second association between the first IGTK and the key identifier for the first IGTK, and a third association between the second IGTK and the key identifier for the second IGTK, and means for selecting the first IGTK or the second IGTK for decoding of the fifth message based on the second and third associations.

In Example 45, the subject matter of Example 44 optionally includes wherein the WUR key identifiers do not overlap with the key identifier of the first IGTK and do not overlap with the key identifier for the second IGTK.

In Example 46, the subject matter of any one or more of Examples 38-45 optionally include means authenticating a WUR beacon frame based on the WUR IGTK, and process the WUR beacon frame based on the authentication.

In Example 47, the subject matter of any one or more of Examples 38-46 optionally include means for decoding a multicast/broadcast integrity protocol (BIP) message, received by the PCR, and authenticate the BIP message based on the first IGTK.

In Example 48, the subject matter of any one or more of Examples 38-47 optionally include means for performing a four way handshake as a supplicant device with the AP as an authenticator device, wherein the means for performing the four way handshake is configured to generate an snonce, receiving an anonce from the authenticator device, and means for receiving the WUR IGTK from the authenticator device.

In Example 49, the subject matter of any one or more of Examples 38-48 optionally include means for determining the second MIC based on a local timer synchronization function (TSF) timer.

Example 50 is a method of encoding a wake-up radio (WUR) frame by an access point (AP), comprising: generating a first integrity group temporal key (IGTK) for communications to primary connectivity radios (PCRs) of one or more wake-up radio (WUR) non-access point (non-AP) stations (STAs); encoding a broadcast/multicast integrity protocol (BIP) frame based on the first IGTK; configuring the AP to transmit the BIP frame to the one or more WUR non-AP STAs; generating a wake-up radio (WUR) IGTK for WUR communications to one or more wake-up radios of the one or more WUR non-AP STAs; encoding a wake-up radio (WUR) frame; generating a message integrity code (MIC) for the WUR frame based on the WUR IGTK key; encoding the MIC in the WUR frame; and configuring the AP to transmit the WUR frame.

In Example 51, the subject matter of Example 50 optionally includes configuring the AP to communicate with the WUR non-AP STA using the first IGTK when the PCR of the WUR non-AP STA is in an awake state; and configuring the AP to communicate with the WUR non-AP STA using the WUR IGTK when the PCR of the WUR non-AP STA is in a doze state.

In Example 52, the subject matter of any one or more of Examples 50-51 optionally include allocating a first key identifier for the first IGTK from a first defined key identifier range and allocating a second key identifier for the WUR IGTK from a second defined key identifier range.

In Example 53, the subject matter of Example 52 optionally includes generating a second WUR IGTK for communications with the one or more WUR non-AP STAs for WUR communications; generating a third key identifier to identify the second WUR IGTK; and encoding a second WUR frame based on the second WUR IGTK in response to the one or more WUR non-AP STAs being provided with the second WUR IGTK.

In Example 54, the subject matter of any one or more of Examples 50-53 optionally include encoding a portion of a timing synchronization function (TSF) timer in the WUR frame.

Example 55 is an apparatus for encoding a wake-up radio (WUR) frame by an access point (AP), comprising: means for generating a first integrity group temporal key (IGTK) for communications to primary connectivity radios (PCRs) of one or more wake-up radio (WUR) non-access point (non-AP) stations (STAs); means for encoding a broadcast/multicast integrity protocol (BIP) frame based on the first IGTK; means for configuring the AP to transmit the BIP frame to the one or more WUR non-AP STAs; means for generating a wake-up radio (WUR) IGTK for WUR communications to one or more wake-up radios of the one or more WUR non-AP STAs; means for encoding a wake-up radio (WUR) frame; means for generating a message integrity code (MIC) for the WUR frame based on the WUR IGTK key; means for encoding the MIC in the WUR frame; and means for configuring the AP to transmit the WUR frame.

In Example 56, the subject matter of Example 55 optionally includes means for configuring the AP to communicate with the WUR non-AP STA using the first IGTK when the PCR of the WUR non-AP STA is in an awake state; and means for configuring the AP to communicate with the WUR non-AP STA using the WUR IGTK when the PCR of the WUR non-AP STA is in a doze state.

In Example 57, the subject matter of any one or more of Examples 55-56 optionally include means for allocating a first key identifier for the first IGTK from a first defined key identifier range and allocating a second key identifier for the WUR IGTK from a second defined key identifier range.

In Example 58, the subject matter of Example 57 optionally includes means for generating a second WUR IGTK for communications with the one or more WUR non-AP STAs for WUR communications; means for generating a third key identifier to identify the second WUR IGTK; and means for encoding a second WUR frame based on the second WUR IGTK in response to the one or more WUR non-AP STAs being provided with the second WUR IGTK.

In Example 59, the subject matter of any one or more of Examples 55-58 optionally include means for encoding a portion of a timing synchronization function (TSF) timer in the WUR frame.

Example 60 is a non-transitory computer readable medium comprising instructions that when executed configure hardware processing circuitry to perform operations to encode a wake-up radio (WUR) frame by an access point (AP), the operations comprising: generating a first integrity group temporal key (IGTK) for communications to primary connectivity radios (PCRs) of one or more wake-up radio (WUR) non-access point (non-AP) stations (STAs); encoding a broadcast/multicast integrity protocol (BIP) frame based on the first IGTK; configuring the AP to transmit the BIP frame to the one or more WUR non-AP STAs; generating a wake-up radio (WUR) IGTK for WUR communications to one or more wake-up radios of the one or more WUR non-AP STAs; encoding a wake-up radio (WUR) frame; generating a message integrity code (MIC) for the WUR frame based on the WUR IGTK key; encoding the MIC in the WUR frame; and configuring the AP to transmit the WUR frame.

In Example 61, the subject matter of Example 60 optionally includes the operations further comprising: configuring the AP to communicate with the WUR non-AP STA using the first IGTK when the PCR of the WUR non-AP STA is in an awake state; and configuring the AP to communicate with the WUR non-AP STA using the WUR IGTK when the PCR of the WUR non-AP STA is in a doze state.

In Example 62, the subject matter of Example 61 optionally includes the operations further comprising: generating a second WUR IGTK for communications with the one or more WUR non-AP STAs for WUR communications; generating a third key identifier to identify the second WUR IGTK; and encoding a second WUR frame based on the second WUR IGTK in response to the one or more WUR non-AP STAs being provided with the second WUR IGTK.

In Example 63, the subject matter of any one or more of Examples 60-62 optionally include the operations further comprising encoding a portion of a timing synchronization function (TSF) timer in the WUR frame.

Example 64 is an apparatus for encoding a wake-up radio (WUR) frame by an access point (AP), comprising: a memory; and processing circuitry coupled to the memory, the first processing circuity configured to: generate a first integrity group temporal key (IGTK) for communications to primary connectivity radios (PCRs) of one or more wake-up radio (WUR) non-access point (non-AP) stations (STAs); encode a broadcast/multicast integrity protocol (BIP) frame based on the first IGTK; configure the AP to transmit the BIP frame to the one or more WUR non-AP STAs; generate a wake-up radio (WUR) IGTK for WUR communications to one or more wake-up radios of the one or more WUR non-AP STAs; encode a wake-up radio (WUR) frame; generate a message integrity code (MIC) for the WUR frame based on the WUR IGTK key; encode the MIC in the WUR frame; and configure the AP to transmit the WUR frame.

In Example 65, the subject matter of Example 64 optionally includes wherein the processing circuitry is further configured to: configure the AP to communicate with the WUR non-AP STA using the first IGTK when the PCR of the WUR non-AP STA is in an awake state; and configure the AP to communicate with the WUR non-AP STA using the WUR IGTK when the PCR of the WUR non-AP STA is in a doze state.

In Example 66, the subject matter of any one or more of Examples 64-65 optionally include wherein the processing circuitry is further configured to allocate a first key identifier for the first IGTK from a first defined key identifier range and to allocate a second key identifier for the WUR IGTK from a second defined key identifier range.

In Example 67, the subject matter of Example 66 optionally includes wherein the processing circuitry is further configured to: generate a second WUR IGTK for communications with the one or more WUR non-AP STAs for WUR communications; generate a third key identifier to identify the second WUR IGTK; and encode a second WUR frame based on the second WUR IGTK in response to the one or more WUR non-AP STAs being provided with the second WUR IGTK.

In Example 68, the subject matter of any one or more of Examples 64-67 optionally include wherein the processing circuitry is further configured to encode a portion of a timing synchronization function (TSF) timer in the WUR frame.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to ROM; RAM; magnetic disk storage media; optical storage media; flash memory and the like.

The invention claimed is:

1. An apparatus of a wake-up radio (WUR) non-access point (non-AP) station (STA), the apparatus comprising:
a memory;
processing circuitry coupled to the memory, the processing circuitry configured to:
perform a 4-way handshake with an access point (AP) utilizing Extensible Authentication Protocol (EAP) over LAN (EAPOL) key frames to establish an integrity group temporal key association (IGTKSA) for management frame protection and to establish a wake-up radio integrity group temporal key (WIGTK) for WUR frame protection;
wherein as part of the 4-way handshake, the processing circuitry is configured to decode an EAPOL key frame received from the AP, the EAPOL key frame comprising an integrity group temporal key (IGTK) for the management frame protection and the WIGTK for the WUR frame protection,
configure the WUR non-AP STA to exchange one or more management frames with the AP, the one or more management frames protected with the IGTK, wherein the one or more management frames include a WUR mode element for WUR parameters for use by the WUR non-AP STA during WUR mode operation,
wherein during WUR mode operation, the processing circuitry is configured to:
decode a WUR wake-up frame received from the AP to determine a WIGTK key identifier, the WIGTK key identifier being in a miscellaneous subfield of the WUR wake up frame, the WIGTK key identifier identifying the WIGTK for WUR frame protection;
compute a message integrity code (MIC) using the identified WIGTK to authenticate the WUR wake-up frame;
if the WUR wake-up frame is not authenticated, the processing circuitry is configured to ignore the WUR wake-up frame; and
if the WUR wake-up frame is authenticated, the processing circuitry is to configure the WUR non-AP STA to receive data from the AP.

2. The apparatus of claim 1, wherein to update the WIGTK, the processing circuitry is configured to perform a two-way group handshake with the AP to receive a new WIGTK in an EAPOL key frame.

3. The apparatus of claim 1 wherein the WUR wake-up frame is a broadcast or group addressed frame.

4. The apparatus of claim 3, wherein the processing circuitry is configured to perform a broadcast/multicast integrity protocol (BIP) to protect management frames and WUR wake-up frames within a basic service set (BSS) that include the AP and one or more other STAs.

5. The apparatus of claim 1, wherein to authenticate the WUR wake-up frame, the processing circuitry is configured to compare a value of the computed MIC with a received MIC value, the received MIC value being received in a frame check sequence (FCS) field of the WUR wake-up frame.

6. The apparatus of claim 5, wherein if the value of the computed MIC does not match the received MIC value, the processing circuitry is configured to ignore the WUR wake-up frame.

7. The apparatus of claim 1 wherein during WUR mode operation, the WUR non-AP STA is configured to be in either a WUR doze state or a WUR awake state, and
wherein the processing circuitry configures the WUR non-AP STA to receive the WUR wake-up frame when the WUR non-AP STA is in WUR awake state.

8. The apparatus of claim 7 wherein during WUR mode operation, the processing circuitry is to configure the WUR non-AP STA to alternate between the WUR doze state and the WUR awake state.

9. The apparatus of claim 8 wherein the processing circuitry is configured to decode a WUR beacon frame and update a time synchronization function (TSF) based on a timestamp included in the WUR beacon frame.

10. The apparatus of claim 1, wherein the memory is configured to store the WUR parameters for use by the WUR non-AP STA during WUR mode operation.

11. The apparatus of claim 10 further comprising: mixer circuitry to down-convert RF signal to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry,
wherein the processing circuitry is configured to decode the baseband signals, the baseband signals including the EAPOL key frame.

12. The apparatus of claim 10 further comprising: mixer circuitry to down-convert RF signal to baseband signals; and
synthesizer circuitry, the synthesizer circuitry comprising a delta-sigma synthesizer, the synthesizer circuitry configured to generate an output frequency for use by the mixer circuitry,
wherein the processing circuitry is configured to decode the baseband signals, the baseband signals including the EAPOL key frame.

13. A non-transitory computer-readable storage medium that stores instructions for execution by processing circuitry of a wake-up radio (WUR) non-access point (non-AP) station (STA), the instructions to configure the processing circuitry to:

perform a 4-way handshake with an access point (AP) utilizing Extensible Authentication Protocol (EAP) over LAN (EAPOL) key frames to establish an integrity group temporal key association (IGTKSA) for management frame protection and to establish a wake-up radio integrity group temporal key (WIGTK) for WUR frame protection;

wherein as part of the 4-way handshake, the processing circuitry is configured to decode an EAPOL key frame received from the AP, the EAPOL key frame comprising an integrity group temporal key (IGTK) for the management frame protection and the WIGTK for the WUR frame protection, configure the WUR non-AP STA to exchange one or more management frames with the AP, the one or more management frames protected with the IGTK, wherein the one or more management frames include a WUR mode element for WUR parameters for use by the WUR non-AP STA during WUR mode operation, wherein during WUR mode operation, the processing circuitry is configured to: decode a WUR wake-up frame received from the AP to determine a WIGTK key identifier, the WIGTK key identifier being in a miscellaneous subfield of the WUR wake up frame, the WIGTK key identifier identifying the WIGTK for WUR frame protection;

compute a message integrity code (MIC) using the identified WIGTK to authenticate the WUR wake-up frame;

if the WUR wake-up frame is not authenticated, the processing circuitry is configured to ignore the WUR wake-up frame; and if the WUR wake-up frame is authenticated, the processing circuitry is to configure the WUR non-AP STA to receive data from the AP.

14. The non-transitory computer-readable storage of claim 13, wherein to update the WIGTK, the processing circuitry is configured to perform a two-way group handshake with the AP to receive a new WIGTK in an EAPOL key frame.

15. The non-transitory computer-readable storage of claim 14 wherein the WUR wake-up frame is a broadcast or group addressed frame.

16. The non-transitory computer-readable storage of claim 15, wherein the processing circuitry is configured to perform a broadcast/multicast integrity protocol (BIP) to protect management frames and WUR wake-up frames within a basic service set (BSS) that include the AP and one or more other STAs.

17. The non-transitory computer-readable storage of claim 13, wherein to authenticate the WUR wake-up frame, the processing circuitry is configured to compare a value of the computed MIC with a received MIC value, the received MIC value being received in a frame check sequence (FCS) field of the WUR wake-up frame, and wherein if the value of the computed MIC does not match the received MIC value, the processing circuitry is configured to ignore the WUR wake-up frame.

18. The non-transitory computer-readable storage of claim 13 wherein during WUR mode operation, the WUR non-AP STA is configured to be in either a WUR doze state or a WUR awake state, wherein the processing circuitry configures the WUR non-AP STA to receive the WUR wake-up frame when the WUR non-AP STA is in WUR awake state, and wherein during WUR mode operation, the processing circuitry is to configure the WUR non-AP STA to alternate between the WUR doze state and the WUR awake state.

19. The non-transitory computer-readable storage of claim 18 wherein the processing circuitry is configured to decode a WUR beacon frame and update a time synchronization function (TSF) based on a timestamp included in the WUR beacon frame.

20. An apparatus of an access point (AP) configured performing for wake-up radio (WUR) mode operations with a wake-up radio (WUR) non-access point (non-AP) station (STA), the apparatus comprising:

a memory;

processing circuitry coupled to the memory, the processing circuitry configured to:

perform a 4-way handshake with the WUR non-AP STA utilizing Extensible Authentication Protocol (EAP) over LAN (EAPOL) key frames to establish an integrity group temporal key association (IGTKSA) for management frame protection and to establish a wake-up radio integrity group temporal key (WIGTK) for WUR frame protection;

wherein as part of the 4-way handshake, the processing circuitry is configured to encode an EAPOL key frame for transmission to the WUR non-AP STA, the EAPOL key frame comprising an integrity group temporal key (IGTK) for the management frame protection and the WIGTK for the WUR frame protection, exchange one or more management frames with the WUR non-AP STA, the one or more management frames protected with the IGTK, wherein the one or more management frames include a WUR mode element for WUR parameters for use by the WUR non-AP STA during WUR mode operation, wherein during WUR mode operation of the WUR non-AP STA, the processing circuitry is configured to:

encode a WUR wake-up frame for transmission to the WUR non-AP STA, the WUR wake-up frame encoded to include a WIGTK key identifier, the WIGTK key identifier being in a miscellaneous subfield of the WUR wake up frame, the WIGTK key identifier identifying the WIGTK for WUR frame protection, the WUR wake-up frame further encoded to include a message integrity code (MIC) for use by the WUR non-AP STA in authenticating the the WUR wake-up frame based on a comparison of the MIC with a MIC computed using the identified WIGTK, the MIC being included in a frame check sequence (FCS) field of the WUR wake-up frame.

21. The apparatus of claim 20 wherein during WUR mode operation, the WUR non-AP STA is configured to be in either a WUR doze state or a WUR awake state, and wherein the processing circuitry configures the AP to transmit the WUR wake-up frame to the WUR non-AP STA when the WUR non-AP STA is in WUR awake state.

22. The apparatus of claim 21 wherein the WUR wake-up frame is encoded to be a broadcast or group addressed frame.

* * * * *

UNITED STATES PATENT AND TRADEMARK OFFICE
CERTIFICATE OF CORRECTION

PATENT NO.       : 10,735,960 B2
APPLICATION NO.  : 16/176541
DATED            : August 4, 2020
INVENTOR(S)      : Huang et al.

Page 1 of 1

It is certified that error appears in the above-identified patent and that said Letters Patent is hereby corrected as shown below:

In the Claims

In Column 46, Line 48, in Claim 20, delete "the the" and insert --the-- therefor Signed and Sealed this
Twelfth Day of January, 2021

Andrei Iancu
*Director of the United States Patent and Trademark Office*